United States Patent
Miyao et al.

(10) Patent No.: US 12,494,492 B2
(45) Date of Patent: Dec. 9, 2025

(54) SUPPORTED METAL CATALYST, METHOD FOR PRODUCING SAME, AND METHOD FOR PRODUCING CARRIER

(71) Applicants: UNIVERSITY OF YAMANASHI, Kofu (JP); NIKKI-UNIVERSAL CO., LTD., Tokyo (JP)

(72) Inventors: Toshihiro Miyao, Kofu (JP); Hanako Nishino, Kofu (JP); Kazutoshi Higashiyama, Kofu (JP); Makoto Uchida, Kofu (JP); Akihiro Iiyama, Kofu (JP); Kazuya Shibanuma, Hiratsuka (JP); Naoto Koizumi, Hiratsuka (JP)

(73) Assignees: UNIVERSITY OF YAMANASHI, Yamanashi (JP); NIKKI-UNIVERSAL CO., LTD., Tokyo (JP)

(*) Notice: Subject to any disclaimer, the term of this patent is extended or adjusted under 35 U.S.C. 154(b) by 694 days.

(21) Appl. No.: 17/795,027

(22) PCT Filed: Feb. 5, 2021

(86) PCT No.: PCT/JP2021/004402
§ 371 (c)(1),
(2) Date: Jul. 25, 2022

(87) PCT Pub. No.: WO2021/161929
PCT Pub. Date: Aug. 19, 2021

(65) Prior Publication Data
US 2023/0085417 A1 Mar. 16, 2023

(30) Foreign Application Priority Data
Feb. 10, 2020 (JP) .................. 2020-020878

(51) Int. Cl.
*H01M 4/92* (2006.01)
*H01M 4/86* (2006.01)
(Continued)

(52) U.S. Cl.
CPC ......... *H01M 4/926* (2013.01); *H01M 4/8605* (2013.01); *H01M 4/8803* (2013.01); *H01M 4/921* (2013.01); *H01M 2004/8689* (2013.01)

(58) Field of Classification Search
None
See application file for complete search history.

(56) References Cited

U.S. PATENT DOCUMENTS 11,367,879 B2 * 6/2022 Shintani .............. H01M 4/8657
2002/0177032 A1 11/2002 Suenaga et al.
(Continued)

FOREIGN PATENT DOCUMENTS

| CN | 1451185 A | 10/2003 |
| CN | 101214437 A | 7/2008 |

(Continued)

OTHER PUBLICATIONS

Office Action issued on Jul. 20, 2023, in corresponding Chinese Application No. 202180007251.0, 16 pages.
(Continued)

*Primary Examiner* — Tracy M Dove
(74) *Attorney, Agent, or Firm* — Maier & Maier, PLLC

(57) ABSTRACT

The present invention provides a supported metal catalyst with excellent effectiveness factor of active metal particles which are also free from deactivation by contacting with ionomer.

According to the present invention, provided is a supported metal catalyst, comprising a support that is a collective body of conductive particles; and dispersed active metal particles supported on the conductive particles, wherein the conduc- (Continued)

tive particles include a plurality of pores, an average entrance pore diameter of the pores is 1 to 20 nm, a standard deviation of the average entrance pore diameter is equal to or less than 50% of the average entrance pore diameter, a number fraction of the active metal particles supported in a surface layer region of the conductive particles divided by the total number of the active metal particles is equal to or more than 50%, and the surface layer region is a region on a surface of the conductive particles or a region in the pores within a depth of 15 nm from the surface.

18 Claims, 23 Drawing Sheets

(51) Int. Cl.
   *H01M 4/88* (2006.01)
   *H01M 4/90* (2006.01)

(56) References Cited

U.S. PATENT DOCUMENTS

| | | | |
|---|---|---|---|
| 2004/0131919 | A1 | 7/2004 | Yasumoto et al. |
| 2006/0166811 | A1 | 7/2006 | Huang et al. |
| 2006/0251953 | A1 | 11/2006 | Li et al. |
| 2007/0116625 | A1 | 5/2007 | Joo et al. |
| 2007/0224479 | A1 | 9/2007 | Tadokoro et al. |
| 2009/0011928 | A1 | 1/2009 | Nwoga et al. |
| 2009/0098441 | A1 | 4/2009 | Suga |
| 2010/0092830 | A1 | 4/2010 | Hayashi et al. |
| 2013/0273460 | A1 | 10/2013 | Moon et al. |
| 2015/0017555 | A1 | 1/2015 | Schüth et al. |
| 2015/0050583 | A1 | 2/2015 | Schüth et al. |
| 2020/0127299 | A1* | 4/2020 | Shintani .............. H01M 8/1018 |
| 2021/0184228 | A1 | 6/2021 | Nagamori et al. |

FOREIGN PATENT DOCUMENTS

| | | |
|---|---|---|
| CN | 100588459 C | 2/2010 |
| CN | 109675552 A | 4/2019 |
| JP | 2002-231257 A | 8/2002 |
| JP | 2006228745 A | 8/2006 |
| JP | 2008-527673 A | 7/2008 |
| JP | 2015-513449 A | 5/2015 |
| JP | 2018-010806 A | 1/2018 |
| KR | 1020060135899 A | 12/2006 |
| WO | 2013035698 A1 | 3/2013 |
| WO | 2019221168 A1 | 11/2019 |

OTHER PUBLICATIONS

Dang et al., "Dispersion and Electrocatalytic Performance of Platinum Nanoparticles Supported on Ordered Mesoporous Carbon", Acta Physico Chimica Sinica, 2007, vol. 23, No. 7, pp. 1085-1089 (English Abstract Provided).

Office Action issued on Dec. 10, 2024, in corresponding Korean Application No. 10-2022-7029854, 22 pages.

Extended Search Report issued on Jul. 10, 2023, in corresponding European Application No. 21754473.3, 10 pages.

Tang et al., "Tailored Design of Functional Nanoporous Carbon Materials Toward Fuel Cell Applications", Nano Today, Jun. 1, 2014, vol. 9, No. 3, pp. 305-323.

Office Action issued on Nov. 3, 2023, in corresponding Chinese Application No. 202180007251.0, 15 pages.

Yanlong et al. "Organometallic Chemistry and Catalysis", Chemical Industry Press, Jan. 31, 1997, 8 pages.

International Search Report mailed Apr. 20, 2021, in corresponding to International Application No. PCT/JP2021/004402; 5 pages (with English Translation).

* cited by examiner

Manufacture Example 1 (micelle template, no stirring, interconnected structure)

Manufacture Example 2 (micelle template, stirred at 15 rpm, interconnected structure)

Manufacture Example 3 (micelle template, diluted to 1/2 concentration, interconnected structure)

Manufacture Example 4 (micelle template, stirred at 50 rpm, single particle)

Manufacture Example 5 (micelle template, stirred at 340 rpm, single particle)

Manufacture Example 6 (micelle template, coarse particle)

Manufacture Example 7 (mesoporous silica template)

Manufacture Example 8 (concentration dependence of carbon source sphere in the bonding step)

Manufacture Example 9 (heating temperature dependence in the bonding step)

Manufacture Example 10 (effect of annealing temperature)

Example 1 (reverse micelle method, Rw=3, coarse particle)

Example 3 (protective colloid method, coarse particle)

Example 5 (reverse micelle method, Rw=3, OMC-NS, two-liquid mixing method)

SUPPORTED METAL CATALYST, METHOD FOR PRODUCING SAME, AND METHOD FOR PRODUCING CARRIER

TECHNICAL FIELD

The present invention relates to a supported metal catalyst and a manufacturing method thereof and to a manufacturing method of a support. The supported metal catalyst of the present invention is suitably used as an electrode catalyst (particularly as a cathode catalyst) of a fuel cell.

BACKGROUND

Patent Literature 1 discloses a supported metal catalyst in which active metal particles are supported on MCND (Mesoporous Carbon Nano Dendrite). MCND has a well-developed pore structure, and the ionomer-induced deactivation of the active metal particles can be avoided by supporting the active metal particles in pores.

CITATION LIST

Patent Literature

Patent Literature 1: JP-A-2018-10806

SUMMARY OF INVENTION

Technical Problem

However, the effectiveness factor of the active metal particles is not sufficiently high even in the configuration of Patent Literature 1, and it is desired to further increase the effectiveness factor.

The present invention has been made in view of such circumstances and provides a supported metal catalyst with excellent effectiveness factor of active metal particles while avoiding close contact with the ionomer.

Solution to Problem

According to the present invention, provided is a supported metal catalyst, comprising a support that is a collective body of conductive particles; and dispersed active metal particles supported on the conductive particles, wherein the conductive particles include a plurality of pores, an average entrance pore diameter of the pores is 1 to 20 nm, a standard deviation of the average entrance pore diameter is equal to or less than 50% of the average entrance pore diameter, a number fraction of the active metal particles supported in a surface layer region of the conductive particles divided by a total number of the active metal particles is equal to or more than 50%, and the surface layer region is a region on a surface of the conductive particles or a region in the pores within a depth of 15 nm from the surface.

The present inventors have conducted intensive research and have made the following findings. Since MCND in Patent Literature 1 is formed by explosive reaction of silver acetylide, the pore diameter of MCND varies widely. To increase the effectiveness factor of the active metal particles, the active metal particles need to be supported at a shallow position in the pores. However, since the pore diameter of MCND varies widely, it is difficult to control the supporting position of the active metal particles in the pores. Consequently, the active metal particles are supported at a deep position in the pores. At the deep position of the pores, the catalytic reaction rate is lower due to diffusion resistance of reactants used in a catalytic reaction and products generated by the catalytic reaction, resulting in lower effectiveness factor of the catalyst. Therefore, the effectiveness factor of the active metal particles is not sufficient in the supported metal catalyst using MCND of Patent Literature 1.

On the basis of these findings, the inventors have found that the effectiveness factor of the active metal particles can be increased by reducing the variation in the pore diameter of the pores provided on the support and then by causing 50% or more of the active metal particles to be supported in a surface layer region of conductive particles constituting the support, thereby leading to the completion of the invention.

BRIEF DESCRIPTION OF DRAWINGS

FIG. 4 is a schematic diagram of the conductive particle 2 composed of an interconnected structure 2a.

DESCRIPTION OF EMBODIMENTS

Figure 1:
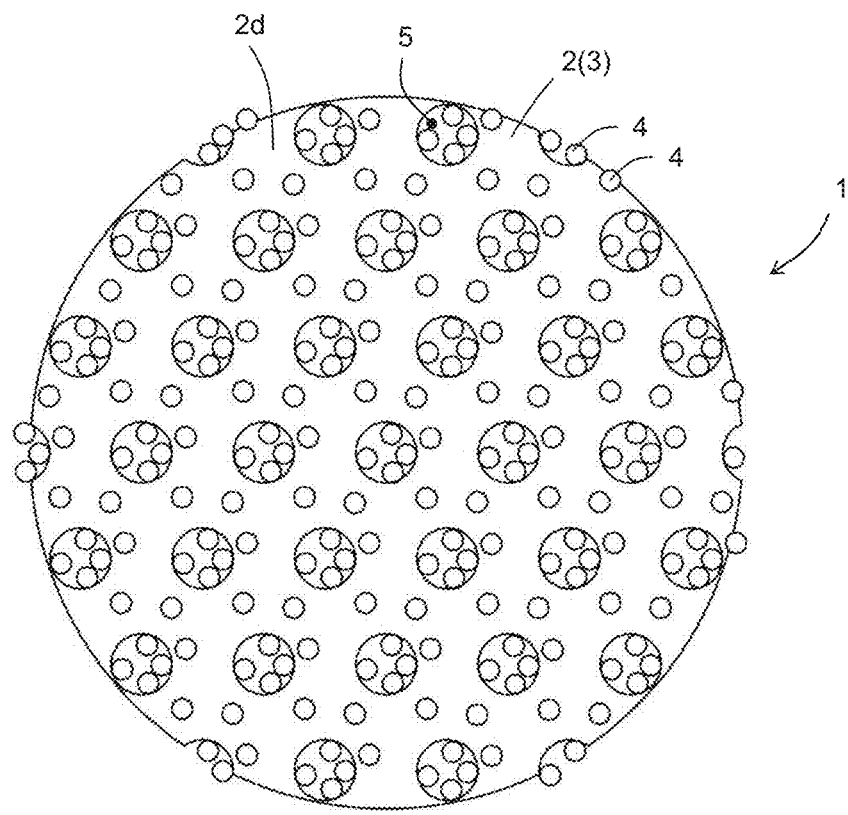
FIG. 1 is a schematic diagram of a supported metal catalyst 1.

Hereinafter, embodiments of the present invention will be explained with reference to the drawings. Various distinctive features shown in the following embodiments can be combined with each other. In addition, an invention can be established independently for each of the distinctive features.

1. Supported Metal Catalyst 1

As shown in FIG. 1 to FIG. 4, a supported metal catalyst 1 of one embodiment of the present invention includes a support 3 and active metal particles 4. Hereinafter, each configuration will be described in detail.

2. Configuration of Support 3

The support 3 is a collective body of conductive particles 2 and is preferably in the form of powder. In this regard, only one conductive particle 2 is shown in FIG. 1 to FIG. 4.

The conductive particles 2 are particles having conductivity. The composition of the conductive particle 2 is not particularly limited, and from the viewpoint of conductivity and ease of manufacture, the conductive particles 2 are preferably carbon particles, more preferably mesoporous carbon particles, and even more preferably ordered mesoporous carbon (OMC) particles having pore diameter and pore spacing with small deviation and periodic arrangement of pores.

Figure 3:
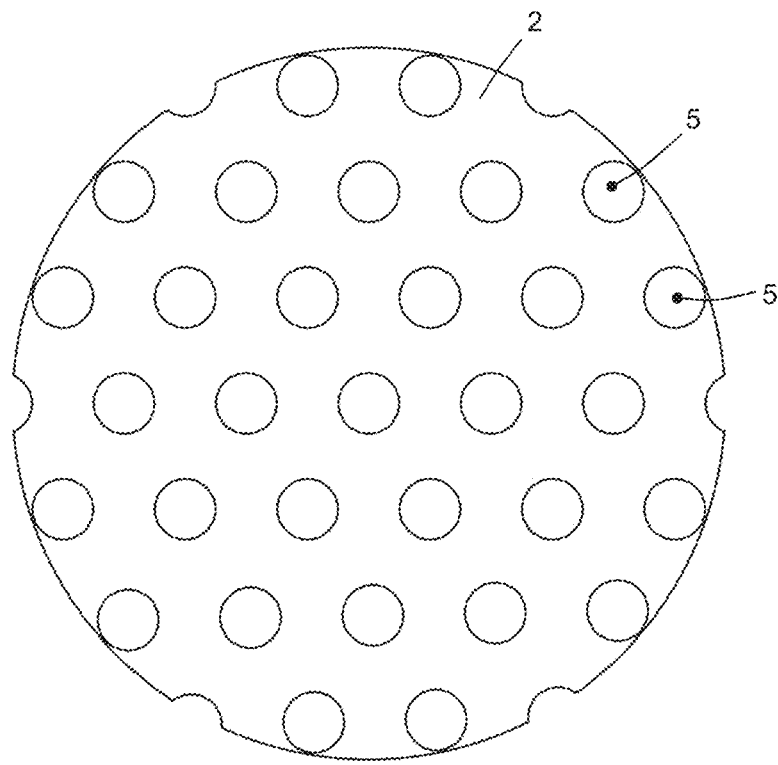
FIG. 3 is a schematic diagram of a conductive particle 2 composed of a single particle.
Figure 4:
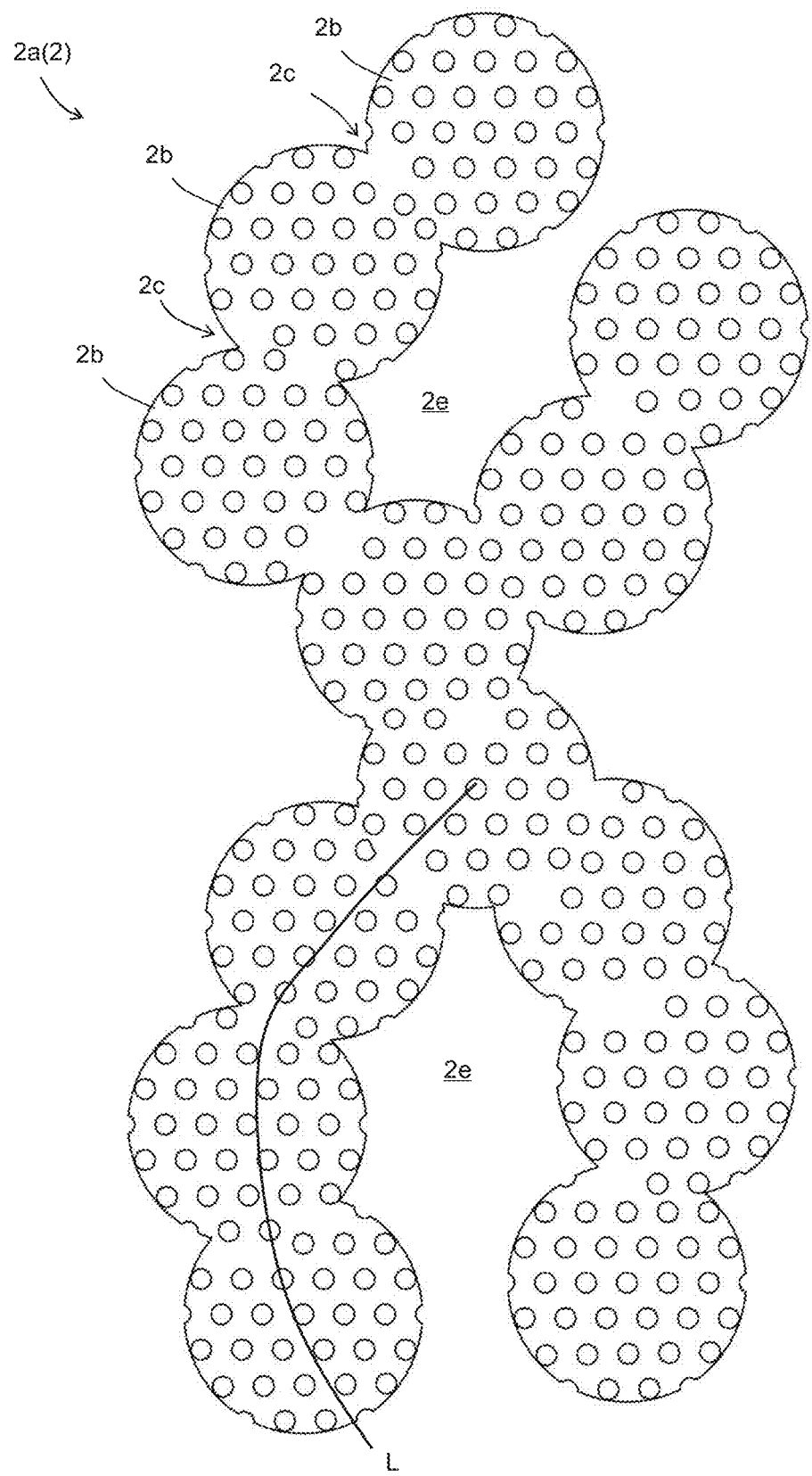

The shape of the conductive particles 2 is not particularly limited. As shown in FIG. 3, the conductive particle 2 may be composed of a (preferably substantially spherical) single particle and is preferably an interconnected structure 2a in which a plurality of (preferably an average of 5 or more) (preferably substantially spherical) primary particles 2b are connected, as shown in FIG. 4. In the following description, the single particle is also referred to as the "primary particle" for convenience. The interconnected structure 2a is referred to as an aggregate and is preferable because a flow path 2e surrounded by the primary particles 2b is formed, which decreases the diffusion resistance of a substance and facilitates catalytic reaction. The flow path 2e may be also referred to as a "primary pore". Further, an agglomerated body of the aggregates that is formed by agglomerating the interconnected structure 2a and the interconnected structure 2a is referred to as a secondary particle, an agglomerate. Since the agglomerate is a secondary particle, it can be crushed relatively easily. A pore formed by a gap between the agglomerates may be referred to as a "secondary pore".

The average primary particle diameter of the conductive particles 2 is preferably 20 to 100 nm. This is because if this value is too small, the entrance diameter of pores 5 may be too small, while if this value is too large, the specific surface area of the support 3 may be too small. This average particle diameter is specifically, for example, 20, 30, 40, 50, 60, 70, 80, 90, 100 nm and may be within the range between any two of the numerical values exemplified herein. The pores 5 open on the primary particle surface of the conductive particles 2, have a nanoscale size and can also be referred to as "nanopores".

Figure 8:
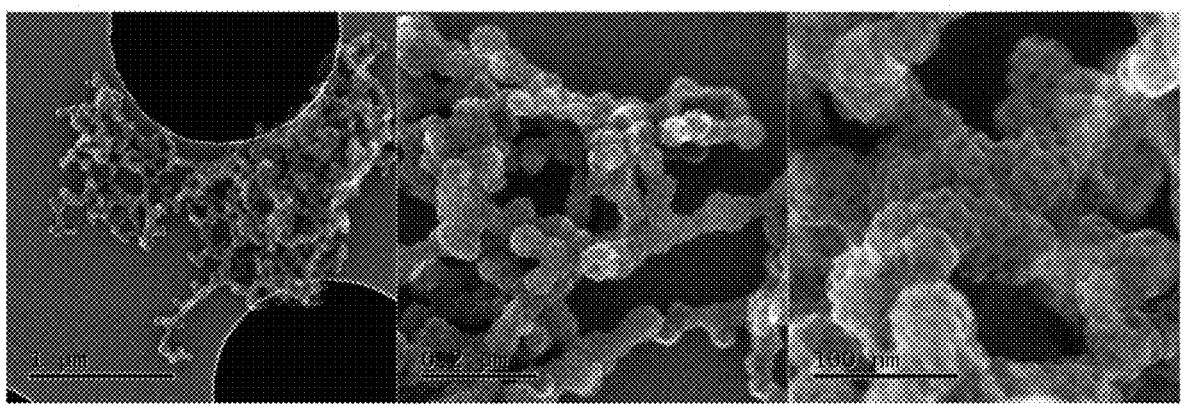
FIG. 8 is an electron microscope image of carbon particles of Manufacture Example 1.

Here, an example of a method for measuring the average primary particle diameter of the conductive particles 2 is described, taking the case where the conductive particles 2 are the interconnected structures 2a of the carbon particles as an example. First, an electron microscope image as shown in FIG. 8 is taken for a powder of the conductive particles 2 by means of a scanning transmission electron microscope (STEM, manufactured by Hitachi High-Technologies Corporation, HD-2700) with an aberration correction lens. From the electron microscope image, it can be seen that the carbon particles are interconnected structures that have a thick portion and thin portion alternately and continuously and is formed by interconnecting an average of 5 or more primary particles. The maximum diameter of the thick portion is defined as the primary particle diameter and is measured at 100 or more points, and the average value of the measured results is calculated. Further, the minimum diameter of the thin portion is defined as the diameter of a connected portion between the primary particles and is measured at 100 or more points, and the average value of the measured results is calculated.

As shown in FIG. 4, in the interconnected structure 2a, the thick portion and the thin portion are alternately continuous along its connecting direction. The thick portion is the primary particle 2b, and the thin portion is a connected portion 2c between the primary particles 2b. When A represents the average primary particle diameter of the interconnected structures 2a, and B represents the average diameter of the connected portions 2c, B/A is preferably 0.1 to 0.9 and more preferably 0.2 to 0.8. If B/A is too small, the strength of the interconnected structures 2a may not be sufficient. B/A is specifically, for example, 0.1, 0.2, 0.3, 0.4, 0.5, 0.6, 0.7, 0.8, 0.9 and may be within the range between any two of the numerical values exemplified herein.

When the conductive particles 2 are the single particles, the average particle diameter of the primary particles 2b is an average value of equivalent circle diameter of the single particles. When the conductive particles 2 are the interconnected structures 2a, the average particle diameter is an average value of the maximum width of the thick portions of the interconnected structures 2a. In the present specification, the average is preferably calculated by averaging 50 or more (preferably 100 or more) measured values.

The average connection number of the interconnected structures 2a (the average value of the number of the primary particles 2b included in the interconnected structures 2a) is preferably 5 or more, more preferably 10 or more, even more preferably 100 or more. This average connection number is, for example, 5 to 10000, specifically, for example, 5, 10, 50, 100, 500, 1000, 5000, 10000, and may be within the range between any two of the numerical values exemplified herein. The average series connection number of the interconnected structures 2a (the average value of the number of the primary particles 2b connected in series) is preferably 3 or more, and more preferably 5 or more. The connection in series means the connection along one line (straight line or curved line). The series connection number is counted starting from the primary particle where a branch is generated. For example, in a branch of a line L in FIG. 4, the series connection number is 4. The average series connection number is an average value of the series connection number for 50 or more (preferably 100 or more) branches. This average series connection number is, for example, 3 to 100, specifically, for example, 3, 5, 10, 50, 100, and may be within the range between any two of the numerical values exemplified herein. When the conductive particles 2 have such a structure, the diffusion resistance of a substance becomes particularly low.

Figure 2A:
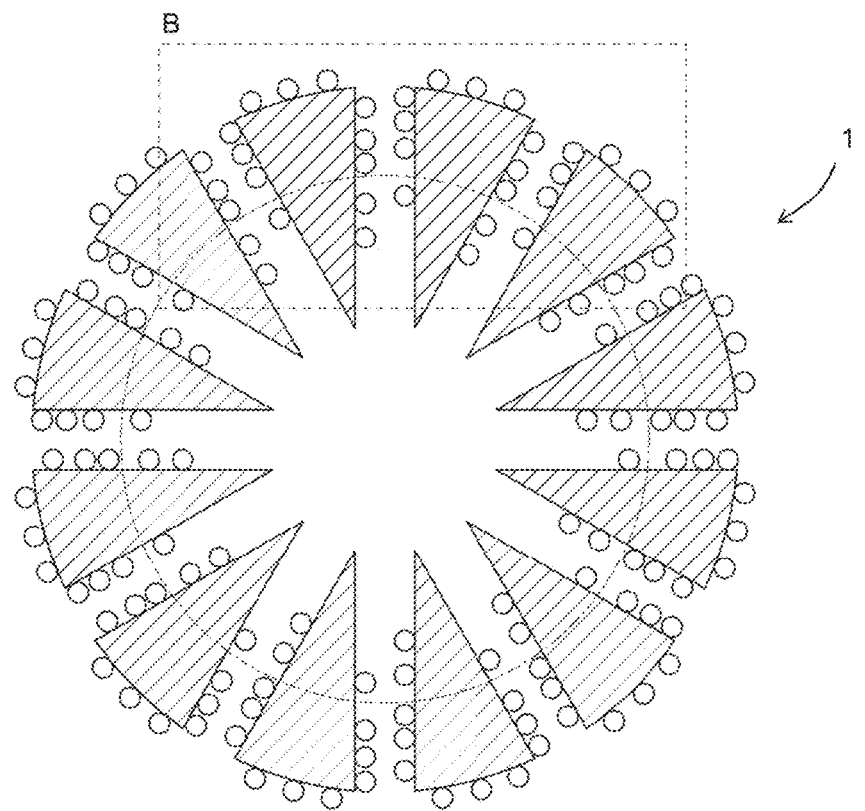
FIG. 2A is a schematic diagram of a cross section of the supported metal catalyst 1.
Figure 2B:
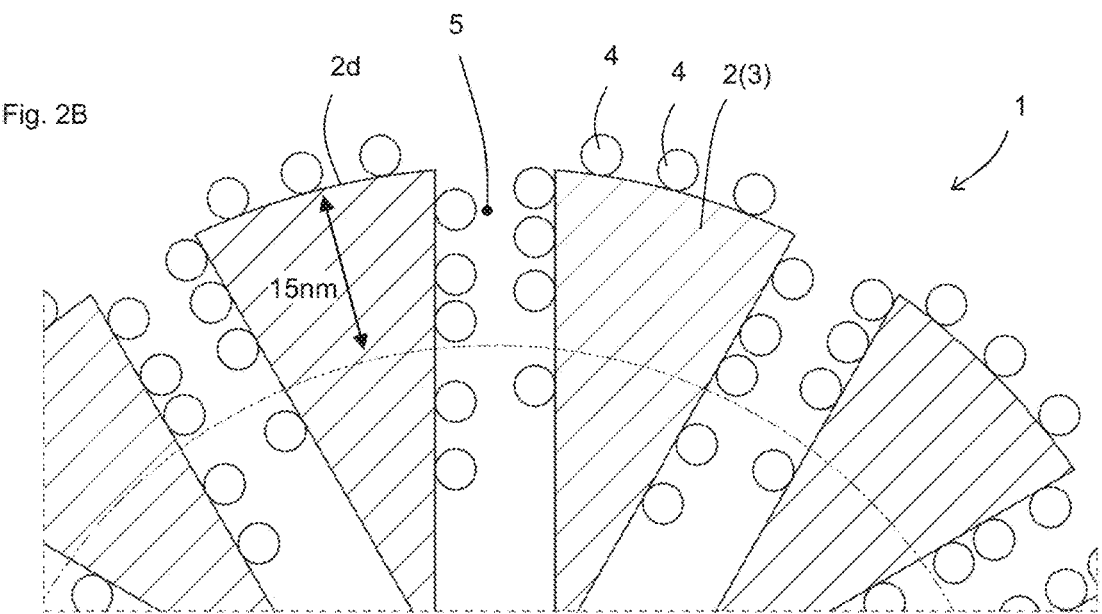
FIG. 2B is an enlarged view of a region B in FIG. 2A.

As shown in FIG. 1 to FIG. 3, the conductive particle 2 has a plurality of pores 5. The plurality of pores 5 is preferably regular in size, arrangement, shape and the like. The diameter of the pores 5 may be constant or may vary along the depth direction. In this regard, while the conductive particle 2 in FIG. 2A and FIG. 2B is hollow at the center, the conductive particles 2 and the primary particles may be hollow or solid at the center.

The average entrance pore diameter of the pores 5 is 1 to 20 nm. The average entrance pore diameter is an average value of the equivalent circle diameter of the entrance of the pores 5. If the average entrance pore diameter is too small, it may be difficult to support the active metal particles 4 in the pores 5, and if the average entrance pore diameter is too large, the active metal particles 4 are supported at a deep position in the pores 5 and are unavailable for the catalytic reaction. The average entrance pore diameter is specifically, for example, 1, 2, 3, 4, 5, 6, 7, 8, 9, 10, 11, 12, 13, 14, 15, 16, 17, 18, 19, 20 nm and may be within the range between any two of the numerical values exemplified herein.

Here, an example of the measurement method of the average entrance pore diameter of the pores 5 is described, taking the case where the conductive particles 2 are carbon particles as an example. The observation of an electron microscope image is performed at a magnification of 500,000 times to 1,000,000 times, and the pore size is measured. At that time, the brightness and contrast of the electron microscope image are adjusted, so that the boundary between an outer surface of the primary particles of the carbon particles and the pores opening on the outer surface becomes clear. Using a particle diameter measurement software (manufactured by NIRECO Corporation, LUZEX AP), the equivalent circle diameter of each pore is measured for 100 or more pores, and the average entrance pore diameter and its standard deviation are obtained.

In this regard, pores in the following three cases are not counted. (1) Since the primary particles of the carbon particles are spherical or spindle-shaped, the size of the pores located near a side surface cannot be accurately measured by electron microscope observation. (2) Even after adjusting the brightness and contrast of the electron microscope image, the boundary line between the outer surface of the carbon particles and the pores may not be sufficiently clear depending on the shape of a sample and observation conditions. (3) If the sample is not within the exact focus range, the pore size cannot be accurately obtained.

The standard deviation of the average entrance pore diameter of the pores 5 is equal to or less than 50% of the average entrance pore diameter, and preferably equal to or less than 30%. The smaller the standard deviation, the smaller the variation in the entrance diameter of the pores 5, and the easier it is to control the supporting position of the active metal particles 4. This standard deviation is, specifically, for example, 0, 5, 10, 15, 20, 25, 30, 35, 40, 45, 50% of the average entrance pore diameter and may be within the range between any two of the numerical values exemplified herein.

The average interpore distance of the pores 5 is preferably 5 to 20 nm. The average interpore distance is an average value of the interpore distance obtained from the distance between circle center points of the adjacent pores 5. If the average interpore distance is too small, the reaction rate may decrease due to the insufficient supply of reactants of the catalytic reaction. If the average interpore distance is too large, the number of the pores 5 may be too small, or the active metal particles 4 may tend to be supported on the surface outside the pores.

Here, an example of the measurement method of the average interpore distance of the pores 5 is described, taking the case where the conductive particles 2 are carbon particles as an example. The observation of the electron microscope image is performed at a magnification of 500,000 times to 1,000,000 times, and the pore size is measured. At that time, the brightness and contrast of the electron microscope image are adjusted, so that the boundary between an outer surface of the primary particles of the carbon particles and the pores opening on the outer surface becomes clear. Using the particle diameter measurement software (manufactured by NIRECO Corporation, LUZEX AP), the equivalent circle diameter of each pore is measured for 100 or more pores.

In this regard, pores in the following three cases are not counted. (1) Since the primary particles of the carbon particles are spherical or spindle-shaped, the size of the pores located near a side surface cannot be accurately measured by electron microscope observation. (2) Even after adjusting the brightness and contrast of the electron microscope image, the boundary line between the outer surface of the carbon particles and the pores may not be sufficiently clear depending on the shape of a sample and observation conditions. (3) If the sample is not within the exact focus range, the pore size cannot be accurately obtained.

Next, the circle center coordinates of the pores approximated by a circle are recorded to obtain the equivalent circle diameter of the pores. The interpore distance is obtained at 100 or more points from the distance between circle center points of the adjacent pores, and the average interpore distance and its standard deviation are calculated.

The standard deviation of the average interpore distance of the pores 5 is preferably equal to or less than 50% of the average interpore distance, and more preferably equal to or less than 30%. The smaller the standard deviation, the easier it is for the active metal particles 4 to be supported uniformly. This standard deviation is specifically, for example, 0, 5, 10, 15, 20, 25, 30, 35, 40, 45, 50% of the average interpore distance and may be within the range between any two of the numerical values exemplified herein.

3. Manufacturing Method of Support 3

The support 3 can be manufactured by any method capable of forming the pores 5 having the above-described physical properties, and examples of the manufacturing method of the support 3 include the hard template method and the soft template method.

The hard template method is a method using a solid, such as fine particles, mesoporous materials, and zeolite, as a template. For example, when the conductive particles 2 are carbon particles, a template having regular pores, such as mesoporous silica, is prepared. The pores of this template are impregnated with a carbon source (e.g., sugar, such as sucrose), the carbon source is carbonized, and the template is removed, so that the carbon particles having the regular pores can be obtained. A portion corresponding to the template becomes the pores.

The soft template method is a method using a phase-separated structure of a soft matter, such as micelle, emulsion, liposome, polymer blend, and liquid crystal, as a template.

For example, when the conductive particles 2 are carbon particles, the conductive particles 2 can be manufactured by a method including a cohesion step, a bonding step, and a carbonizing step.

<Cohesion Step>

Figure 5:
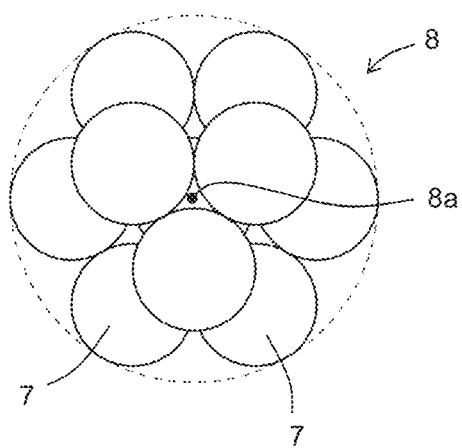
FIG. 5 is a schematic diagram of a carbon source cohered body 8 in which carbon source spheres 7 cohere to each other.

As shown in FIG. 5, in the cohesion step, a carbon source cohered body 8 in which carbon source spheres 7 cohere to each other is formed. The carbon source cohered body 8 becomes a primary particle of the conductive particle 2.

In one example, the carbon source sphere 7 can be formed by forming a coating film of the carbon source on the surface of micelle. The carbon source sphere 7 has a reactive functional group, such as a methylol group or a hydroxyl group, and the carbon source spheres 7 can be bonded to each other, for example, by condensation reaction of the reactive functional groups. Since the carbon source spheres 7 are spheres and cannot cohere without a gap, a gap 8a surrounded by a plurality of carbon source spheres 7 is inevitably formed in the carbon source cohered body 8. The gap 8a becomes the pore 5 of the conductive particle 2. Since the gaps 8a are regularly formed, the pores 5 are also regularly formed.

A manufacture example of the carbon source spheres 7 and the carbon source cohered bodies 8 is as follows.

First, phenol: 0.6057 g as the carbon source, formaldehyde solution: 2.1 mL, and 0.1 M NaOH: 15.1613 g are mixed to prepare a mixed solution.

Next, the mixed solution is stirred in a 70° C. bath at 345 rpm for 0.5 h. Next, after Pluronic F-127 as a template molecule (manufactured by BASF, nonionic surfactant, triblock copolymer composed of a hydrophobic block sandwiched between a pair of hydrophilic blocks, hereinafter referred to as "F-127".): 0.96 g and ultrapure water: 15.0033 g are added, the mixed solution is stirred in a 65° C. bath at 345 rpm for 2 h.

Next, after ultrapure water: 50 g is added, the mixed solution is stirred in a 65° C. bath at 345 rpm for 16 to 18 h and then is allowed to stand still at 25° C., and supernatant liquid: 17.7 mL is taken out.

In the reaction described above, the carbon source sphere 7 in which a micelle composed of F-127 are coated with resol is generated. Then, self-organization of the carbon source spheres 7 takes place and the carbon source cohered bodies 8 are generated.

The micelle can be formed, for example, by dispersing block copolymer having a hydrophilic block and a hydrophobic block in a dispersion medium, such as water. The block copolymer is preferably triblock copolymer composed of a hydrophobic block sandwiched between a pair of hydrophilic blocks. As the block copolymer, for example, a block copolymer in which the hydrophobic block is composed of a polymer of propylene oxide and the hydrophilic block is composed of a polymer of ethylene oxide can be used.

The coating film is composed of, for example, resol. The resol is a phenolic resin having a reactive functional group. The coating film of resol can be formed by polymerizing phenol and formaldehyde in a dispersion medium containing micelle under conditions where formaldehyde is excessive. In one example, the carbon source sphere 7 is formed by coating the micelle composed of the triblock copolymer with a resol coating film.

<Bonding Step>

In the bonding step, carbon source bonded bodies are formed by bonding the carbon source spheres 7 to each other in a state of no stirring or in a state of stirring of the dispersion liquid containing the carbon source cohered bodies 8.

Figure 6:
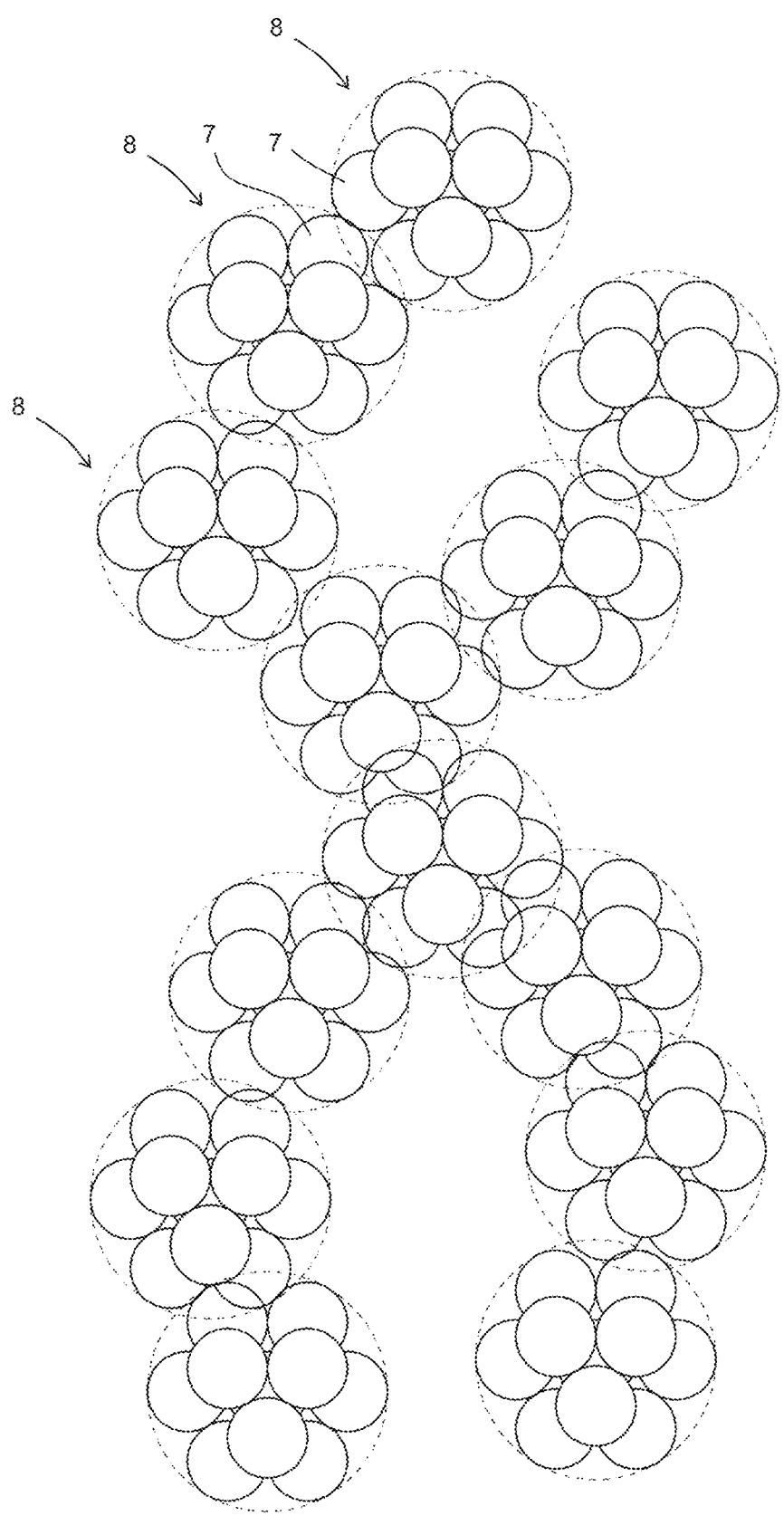
FIG. 6 is a schematic diagram showing a state in which carbon source cohered bodies 8 are connected to each other.

Regarding the bonding between the carbon source spheres 7, when the carbon source spheres 7 are bonded to each other in a state of no stirring or in a state of stirring at the Reynolds number of 1400 or less (hereinafter, referred to as "low-speed stirring") of the dispersion liquid containing the carbon source cohered bodies 8, as shown in FIG. 6, in addition to the bonding between the carbon source spheres 7 included in the same carbon source cohered body 8, the carbon source spheres 7 included in different carbon source cohered bodies 8 are also bonded to each other. In this case, the carbon source bonded bodies having an interconnected structure in which an average of 5 or more carbon source cohered bodies 8 are connected to each other are obtained. By carbonizing such carbon source bonded bodies, the interconnected structures 2a in which an average of 5 or more primary particles 2b are interconnected can be formed. The Reynolds number is preferably 1200 or less, more preferably 1000 or less. The Reynolds number is, for example, 0 to 1400, specifically, for example, 0, 100, 200, 300, 400, 500, 600, 700, 800, 900, 1000, 1100, 1200, 1300, 1400 and may be within the range between any two of the numerical values exemplified herein.

The Reynolds number Re can be calculated on the basis of the following equation.

$$Re = d^2 \times n \times \rho / \mu$$

(where d: blade diameter of a stirrer [m], n: number of rotation [s$^{-1}$], ρ: liquid density [kg/m$^3$], μ: liquid viscosity [Pa·s].)

In one example, Reynolds number Re=1490 when d=20× 10$^{-3}$ m, n=0.83 s$^{-1}$ (in the case of 50 rpm), and in the case of 130° C., pure water, ρ=934.5 kg/m$^3$, and μ=0.208 mPa·s.

On the other hand, when the carbon source spheres 7 are bonded to each other by stirring the dispersion liquid at high speed, the bonding between the carbon source spheres 7 contained in the same carbon source cohered bodies 8 occurs dominantly, and the carbon source bonded bodies of the single particles are obtained. By carbonizing such carbon source bonded bodies, the conductive particles 2 having a single particle structure in which the primary particles 2b are not connected to each other can be obtained.

The dispersion medium is preferably water. Further, it is preferable to bond the carbon source spheres 7 to each other by heating the dispersion liquid. The reaction temperature is, for example, 100150° C., specifically, for example, 100, 110, 120, 130, 140, 150° C. and may be within the range between any two of the numerical values exemplified herein. The reaction time is, for example, 5 to 48 h, specifically, for example, 5, 10, 15, 20, 25, 30, 35, 40, 45, 48 h and may be within the range between any two of the numerical values exemplified herein.

The structure of the carbon source bonded bodies obtained by the reaction can be changed by changing the reaction temperature, the reaction time, and the concentration of the reaction solution. By increasing the reaction temperature, increasing the reaction time, or increasing the concentration of the reaction solution, the connection number and the primary particle diameter of the carbon source cohered bodies 8 can be increased.

<Carbonizing Step>

In the carbonizing step, the conductive particles 2 can be obtained by carbonizing the carbon source bonded bodies.

When the carbon source bonded bodies obtained in the above-described bonding step are heated and carbonized as they are, the primary particles 2b (the primary particles 2b in a state of the single particles, or the primary particles 2b in a state of the interconnected structures 2a) are prone to be three-dimensionally connected to each other to form a structure in which the primary particles 2b excessively cohere to each other. Therefore, it is preferable to re-disperse the carbon source bonded bodies and then dry them before carbonization. Consequently, the cohesion of the primary particles 2b can be mitigated. Further, it is preferable to thinly spread the dispersion liquid obtained by the re-dispersion of the carbon source bonded bodies and then dry it. Consequently, the cohesion of the primary particles 2b can be further mitigated. As an example of a method of spreading the dispersion liquid thinly, there is a method of dropping the dispersion liquid onto a surface, such as the surface of a glass plate. In one example, by dropping the dispersion liquid onto a glass plate heated by a hot plate, the dispersion liquid can be dried in a thinly spread state.

Further, the cohesion of the primary particles 2b may be mitigated by spray-drying the dispersion liquid obtained by the re-dispersion of the carbon source bonded bodies. Freeze-drying is preferable as a drying method.

The carbon source bonded bodies can be carbonized by heating the carbon source bonded bodies in an atmosphere of an inert gas (e.g., nitrogen gas). The carbon source bonded bodies can be carbonized by, for example, heating the carbon source bonded bodies to 600 to 1000° C. This temperature is, for example specifically, for example, 600, 650, 700, 750, 800, 850, 900, 950, 1000° C. and may be within the range between any two of the numerical values exemplified herein.

An annealing step of performing the annealing treatment of the conductive particles 2 may be performed after the carbonizing step. The structure of the conductive particles 2 can be controlled by changing the temperature or time of the annealing treatment. The annealing treatment can be performed by, for example, heating the conductive particles 2 in flowing nitrogen or a vacuum. The temperature of the annealing treatment is, for example, 800 to 2000° C. This temperature is, specifically, for example, 800, 900, 1000, 1100, 1200, 1300, 1400, 1500, 1600, 1700, 1800, 1900, 2000° C. and may be within the range between any two of the numerical values exemplified herein.

<Others>

In addition to the above-described method, the interconnected structures 2a may be generated by connecting the primary particles 2b to each other using a linking agent. The primary particles 2b may be generated by bonding the carbon source spheres 7 to each other while stirring the dispersion liquid at high speed or may be generated by dividing coarse particles of the carbon source (carbon source coarse particles). Here, the carbon source coarse particles may be manufactured by a method described later in Manufacture Example 6 and are particles having the primary particle diameter of more than 100 nm. Examples of the linking agent include compounds having a plurality of reactive functional groups. Each of the reactive functional groups is connected to the primary particles 2b, so that the primary particles 2b are connected to each other via the linking agent.

As the linking agent, specifically, for example, sugar, such as sucrose, and alcohol, such as furfuryl alcohol, can be used.

4. Configuration of Active Metal Particle 4

As shown in FIG. 1, the active metal particles 4 are dispersed and supported on the conductive particles 2. The active metal particles 4 are fine particles of metal or alloy that can function as a catalyst. The active metal particles 4 are preferably platinum or platinum alloy particles. As the platinum alloy, an alloy of platinum and transition metal is preferable. Examples of the transition metal include cobalt and nickel.

As shown in FIG. 1 to FIG. 2B, the active metal particles 4 are supported in a region on a surface 2d of the conductive particles 2 or in the pores 5. Since the diffusion rate of the substance is small at a deep position in the pores 5, the active metal particles 4 supported at the deep position in the pores 5 make little or no contribution to the catalytic reaction. Therefore, if the number fraction of the active metal particles 4 supported at the deep position in the pores 5 is large, the effectiveness factor of the active metal particles 4 will decrease correspondingly. If the effectiveness factor of the active metal particle 4 decreases, more active metal particles 4 need to be supported to achieve the required reaction rate, which leads to an increase in the cost of the catalyst.

Therefore, it is preferable that the proportion of the active metal particles 4 supported in a surface layer region of the conductive particles 2 is high. The surface layer region is a region on the surface 2d of the conductive particles 2 or a region in the pores 5 within a depth X (=15 nm) from the surface 2d (that is, a region outside the alternate long and short dash line in FIG. 2B).

Specifically, the number fraction of the active metal particles 4 supported in the surface layer region (hereinafter, referred to as "particles supported on the surface layer") (the number of the active metal particles 4 supported in the surface layer region/the number of all active metal particles 4) is preferably 50% or more, and more preferably 60% or more. In such a case, the effectiveness factor of the active metal particles 4 is excellent. This number fraction is, specifically, for example, 50, 55, 60, 65, 70, 75, 80, 85, 90, 95, 99, 100% and may be within the range between any two of the numerical values exemplified herein.

Here, an example of a method of calculating the number fraction of the particles supported on the surface layer is described, taking the case where the active metal particles 4 are platinum particles and the conductive particles 2 are carbon particles as an example.

First, a powder of carbon particles on which platinum particles are supported is placed on a silicon wafer substrate, and a protective layer is formed on the outer surface of sample particles by gold vapor deposition. Then, a focused ion beam (FIB) device (FB2200, manufactured by Hitachi High-Technologies Corporation) is used to cut the sample particles with the gallium ion beam, and a sample section for electron microscope observation is prepared. Then, when observing the cut surface with an electron microscope, metal particles (Au particles and Pt particles) present on the sample are observed from a Z-contrast image (atomic number contrast image) shown in FIG. 18, and at the same time, the composition of each of the metal particles is analyzed using an energy-dispersive X-ray spectrometer to distinguish between the Pt particles and the Au particles. The point of change (boundary line) from a portion where the Au particles exist to a portion where only the Pt particles exist without the Au particles is defined as the boundary line between the outer surface and the cross section of the carbon particle. On the electron microscope image, a line segment parallel to the outer surface boundary line is drawn at a position 15 nm from the above-described sample outer surface boundary line in the direction toward the center of the sample particle, and the number fraction of the particles supported on the surface layer is calculated from the ratio of the number of Pt particles between the outer surface boundary line and the line segment at the 15 nm position and the number of Pt particles deeper beyond the line segment at the 15 nm position in the direction toward the center of the sample particle.

In this regard, X may be 5 nm or 10 nm and is more preferably 5 nm or less. Further, X may be set to be the average particle diameter of the primary particles $2b \times Y$. Y is, for example, 0.1, 0.2, 0.3, 0.4, 0.5 and is preferably 0.3. Further, X may be set to be the average entrance pore diameter of the pores $5 \times Z$. Z is, for example, 1, 2, 3, 4, 5 and is preferably 1.

Further, the number fraction of the active metal particles 4 supported in the pores 5 divided by the total number of the active metal particles 4 supported in the surface layer region of the conductive particles 2 is preferably 40% or more. The supported metal catalyst 1 may be thickly coated with an electrolyte material, and in such a case, the activity of the active metal particles 4 coated with the electrolyte material may decrease. By increasing the number fraction of the active metal particles 4 supported in the pores 5, the influence of the decrease in the activity of the active metal particles 4 can be suppressed. This number fraction is specifically, for example, 40, 45, 50, 51, 52, 53, 54, 55, 56, 57, 58, 59, 60, 65, 70, 75, 80, 85, 90, 95, 99, 100% and may be within the range between any two of the numerical values exemplified herein.

In actual operation of a fuel cell vehicle, when the vehicle travels at low speed with a small current density on the electrode catalyst, the electrolyte material present on the support surface may adhere to the active metal particles present on the support surface, and their activity may decrease (reaction rate decrease on the active metal particles on the surface). On the other hand, when the vehicle travels at high speed with a large current density, the adhesion of the electrolyte material to the active metal particles present on the support surface is mitigated by the large amount of water generated on the cathode catalyst, and the activity is restored. However, since the reaction rate of the entire catalyst layer is high, the rate on activity metal in a deep portion of the pores may decrease due to the diffusion resistance to the deep portion of the pores (reaction rate decrease on the active metal particles in the deep portion of the pores). For the above reasons, to address all operating conditions of fuel cell vehicles, the majority of the active metal particles are arranged inside the pores while the active metal particles are arranged in the region inside the pores (15 nm or less) from the vicinity of the support surface, so that a superior catalyst for fuel cell vehicles can be prepared. Further, from this viewpoint, it is considered to be even more effective if the active metal particles are arranged within a range of 10 nm or less, preferably 5 nm or less from the surface.

The average particle diameter of the active metal particles 4 is preferably 1 to 8 nm. This average particle diameter is specifically, for example, 1, 2, 3, 4, 5, 6, 7, 8 nm and may be within the range between any two of the numerical values exemplified herein. When the average particle diameter of the active metal particles 4 is less than 1 nm, the active metal particles 4 may dissolve as the electrode reaction progresses. When the average particle diameter is more than 8 nm, the electrochemically active surface area may become small, and the desired electrode performance may not be achieved. The average particle diameter of the active metal particles 4 is an average value of the equivalent circle diameter.

Here, a method of calculating the average particle diameter is described, taking the case where the active metal particles 4 are platinum particles as an example. First, a catalyst in which platinum particles are supported is placed on a grid with a carbon supporting film for an electron microscope, and the average particle diameter of the equivalent circle diameter of the platinum particles is calculated from an image obtained with an electron microscope.

The value of [the average particle diameter of the active metal particles 4 divided by the average entrance pore diameter of the pores 5] is preferably 0.2 to 0.8. In such a condition, the active metal particles 4 can be easily supported in the surface layer region. This value is specifically, for example, 0.2, 0.3, 0.4, 0.5, 0.6, 0.7, 0.8 and may be within the range between any two of the numerical values exemplified herein.

5. Manufacturing Method of Supported Metal Catalyst

As a method for supporting the active metal particles 4, a usual impregnation method can be first considered. However, with the usual impregnation method, it is not possible to selectively support the particles only near the entrance of the pores, and the particle size distribution of the active metal particles 4 is widened, resulting in mass transfer resistance in addition to inhibition by electrolyte adsorption. Consequently, when used as a cathode of a fuel cell, the particle growth of the active metal particles 4 progresses during operation, causing deterioration.

Therefore, a method in which the active metal particles 4 are synthesized in advance in a liquid phase and then supported is preferable. That is, the active metal particles 4 of uniform size are synthesized in advance in the liquid phase by the reverse micelle method or the protective colloid method and then supported on the support having regular pores. Since the size of the pores 5 of the conductive particles 2 is uniform, the selectivity of the supporting position of the active metal particles 4 can be enhanced, which leads to suppression of catalyst deactivation and reduction of the amount of the active metal particles 4 used.

5-1. Reverse Micelle Method

In the reverse micelle method, a manufacturing method of the supported metal catalyst comprises a mixing step, a reduction step, and a supporting step. Hereinafter, each step will be described.

<Mixing Step>

In the mixing step, a mixed solution (hereinafter, referred to as "active metal precursor mixed solution") is prepared by mixing an active metal precursor solution containing an active metal precursor with a surfactant and an organic solvent.

The active metal precursor is a compound that serves as a raw material reduced to form active metal, and examples thereof include an acid, a salt, or a complex of the active metal. As the active metal precursor, for example, a metal chloride acid and a salt thereof (e.g., potassium salt), an ammine complex, ethylenediamine complex, acetylacetonate complex of the active metal or the like can be used. When the active metal is platinum, platinum precursor compound, such as chloroplatinic acid (e.g., hexachloroplatinic acid, tetrachloroplatinic acid), acetylacetonate platinum ($Pt(acac)_2$), chloroplatinate (e.g., potassium chloroplatinate ($K_2PtCl_4$)), and platinum ammine complex can be used. The active metal precursor solution is preferably an aqueous solution. Further, the active metal precursor is not limited to one type, and a second or third metal salt may be added.

As the surfactant, any surfactant capable of forming a reverse micelle can be used. The examples of the surfactant include anionic surfactant (for example, soap, sulfated oil, polyoxyethylene alkyl ether sulfate, alkyl sulfate ester salt, alkylbenzene sulfonate, alkane sulfonate, α-olefin sulfonate, N-acylamino acid salt, dialkyl sulfosuccinate, alkyl naphthalene sulfonate), cationic surfactant (for example, alkyl trimethylammonium salt, alkyl pyridinium salt), nonionic surfactant (for example, polyoxyethylene alkyl ether, polyoxyethylene alkyl phenyl ether, polyoxyethylene fatty acid ester, polyhydric alcohol fatty acid ester), and amphoteric surfactant (for example, betaine and sulfobetaine). The nonionic surfactant is preferable, the surfactant having a phenylene group is more preferable, polyoxyalkylene alkylphenyl ether is more preferable, polyoxyethylene alkylphenyl ether is preferable, and polyoxyethylene nonylphenyl ether is more preferable. The average addition mole number of polyoxyalkylene is preferably 2 to 10, more preferably 3 to 7, and even more preferably 5. The average addition mole number is specifically, for example, 2, 3, 4, 5, 6, 7, 8, 9, 10 and may be within the range between any two of the numerical values exemplified herein.

The molar ratio Rw between water and the surfactant is preferably 1 to 7 and more preferably 2 to 5. Further, the concentration of the surfactant is preferably equal to or more than the critical micelle concentration and preferably 40 to 160 mmol/L.

As the organic solvent, a hydrophobic organic solvent is preferable, and an organic solvent containing at least one selected from cyclohexane, heptane, and toluene is more preferable.

<Reduction Step>

In the reduction step, the active metal precursor in the active metal precursor mixed solution is reduced to generate the active metal particles 4. The liquid temperature is preferably 20° C. to 30° C.

The active metal precursor can be reduced by adding a reducing agent to the mixed solution. Examples of the reducing agent include $MBR_3H$, MH (where M represents lithium, sodium, or potassium, and R represents a hydrogen atom or a hydrocarbon group, and the hydrocarbon group may be linear or branched and may be saturated or unsaturated), and hydrogen, and $NaBH_4$ is preferable.

The reduction is preferably performed by mixing a solution containing a reducing agent, an organic solvent, water, and surfactant with the active metal precursor mixed solution. In such a case, as compared with the case where the solid reducing agent is directly added to the active metal precursor mixed solution, the reduction rate of the active metal precursor is controlled, and the monodispersity of Pt particles is improved, so that the increase in the supporting rate on the surface layer is expected.

The surfactant in the reducing agent mixed solution can be selected from the group listed in the above-described <Mixing Step> and is preferably the same as the surfactant mixed in the <Mixing Step>.

The molar ratio Rw between the water and the surfactant in the reducing agent mixed solution is preferably 1 to 7 and more preferably 2 to 5, and it is even more preferable that the concentration is the same as the concentration of the active metal precursor mixed solution.

As the organic solvent in the reducing agent mixed solution, a hydrophobic organic solvent is preferable, a solvent containing at least one selected from cyclohexane, heptane, and toluene is more preferable, and the solvent same as the solvent in the active metal precursor mixed solution is even more preferable.

The active metal particles 4 obtained in the reduction step are in a state of being confined in the reverse micelles, and the diameter of the reverse micelles is larger than the diameter of the active metal particles 4. Therefore, the active metal particles 4 are suppressed from being supported at a deep position in the pores 5, and the number fraction of the active metal particles 4 supported in the surface layer region is increased.

The count median diameter measured in the mixed solution by the dynamic light scattering method is the reverse micelle diameter. This reverse micelle diameter is preferably 0.5 to 2 times as large as the average entrance pore diameter of the pores 5. In such a case, the number fraction of the active metal particles 4 supported in the surface layer region is particularly increased. This factor is specifically, for example, 0.5, 0.6, 0.7, 0.8, 0.9, 1, 1.1, 1.2, 1.3, 1.4, 1.5, 1.6, 1.7, 1.8, 1.9, 2 times and may be within the range between any two of the numerical values exemplified herein.

The reverse micelle in the solvent is composed of a surfactant layer surrounding a fine water droplet encapsulating the active metal particle and a solvent layer formed around the surfactant layer. When the reverse micelle diameter is sufficiently smaller than the support pore entrance diameter (the reverse micelle diameter is less than 0.5 times as large as the entrance pore diameter of the pore 5), the interaction between a pore wall and the surfactant is weak because the solvent layer formed outside the surfactant layer hinders contacting the surfactant layer with the inner wall of the pore entrance, so that the reverse micelle penetrates deep inside the pore without collapsing. On the other hand, when the reverse micelle diameter exceeds twice the entrance pore diameter of the pore 5, the reverse micelle diameter is too large compared to the pore entrance diameter, and the reverse micelle cannot penetrate the pore, so that the active metal particle is supported on the surface outside the pore. When the reverse micelle diameter is within the range of 0.5 to 2 times as large as the entrance pore diameter of the pore 5, the diameter of the surfactant layer surrounded by the solvent layer is almost the same as the pore entrance diameter, so that, in the course of the reverse micelle being penetrating the pore entrance, the stability of the reverse micelle is lost and the micelle structure collapses due to strong adsorption between a hydrophobic portion of a surfactant molecule and the support pore wall. At that time, since the active metal particles are adsorbed on a hydrophilic portion of the surfactant, the active metal particles are trapped near the pore entrance via the surfactant and fixed at a short distance from the pore entrance.

<Supporting Step>

In the supporting step, the support 3 which is a collective body of the conductive particles 2 and the active metal particles 4 obtained in the reduction step are mixed to disperse and support the active metal particles 4 on the conductive particles 2.

As the support 3, the support described in "2. Configuration of Support 3" can be used. Mixing is preferably performed by mixing the mixed solution after the reduction step and the support 3. The supported metal catalyst after loading is preferably washed with a solvent having hydrophilic and hydrophobic groups to remove the surfactant, and this solvent is preferably alcohol. This alcohol is preferably methanol or ethanol.

5-2. Protective Colloid Method

In the protective colloid method, the manufacturing method of the supported metal catalyst comprises a mixing step, a reduction step, and a supporting step. Hereinafter, each step will be described.

<Mixing Step>

In the mixing step, a mixed solution is prepared by mixing an active metal precursor solution containing an active metal precursor with a protecting polymer agent and a reducing agent.

The description of the active metal precursor and its solution is similar to that in the reverse micelle method.

The protecting polymer agent is any substance capable of adhering to the active metal precursor to form a hydrophilic protective colloid and preferably contains at least one of polyvinyl pyrrolidone, polyacrylic acid, and polyvinyl alcohol.

As the reducing agent, any reducing agent capable of reducing the active metal precursor can be used. For example, the reducing agent exemplified in the description of the reverse micelle method and alcohol (ethylene glycol, ethanol, methanol, and the like) can be used, and alcohol is preferable.

<Reduction Step>

In the reduction step, the active metal precursor in the mixed solution is reduced to generate the active metal particles 4.

The reduction of the active metal precursor can be performed using the reducing agent in the mixed solution. When alcohol is used as the reducing agent, the reduction is preferably performed by refluxing the mixed solution.

The active metal particles 4 obtained in the reduction step are in a state of hydrophilic protective colloid, and the diameter of the entire hydrophilic protective colloid is larger than the diameter of the active metal particle 4 itself. Therefore, the active metal particles 4 are suppressed from being supported at a deep position in the pores 5, and the number fraction of the active metal particles 4 supported in the surface layer region is increased.

The count median diameter measured in the mixed solution by the dynamic light scattering method corresponds to the diameter of the entire hydrophilic protective colloid, and this count median diameter is preferably 0.5 to 2 times as large as the average entrance pore diameter of the pores 5, which is similar to the reverse micelle method. This factor is specifically, for example, 0.5, 0.6, 0.7, 0.8, 0.9, 1, 1.1, 1.2, 1.3, 1.4, 1.5, 1.6, 1.7, 1.8, 1.9, 2 times and may be within the range between any two of the numerical values exemplified herein.

<Supporting Step>

The description of the supporting step is similar to that in the reverse micelle method.

6. Fuel Cell 200

Figure 7:
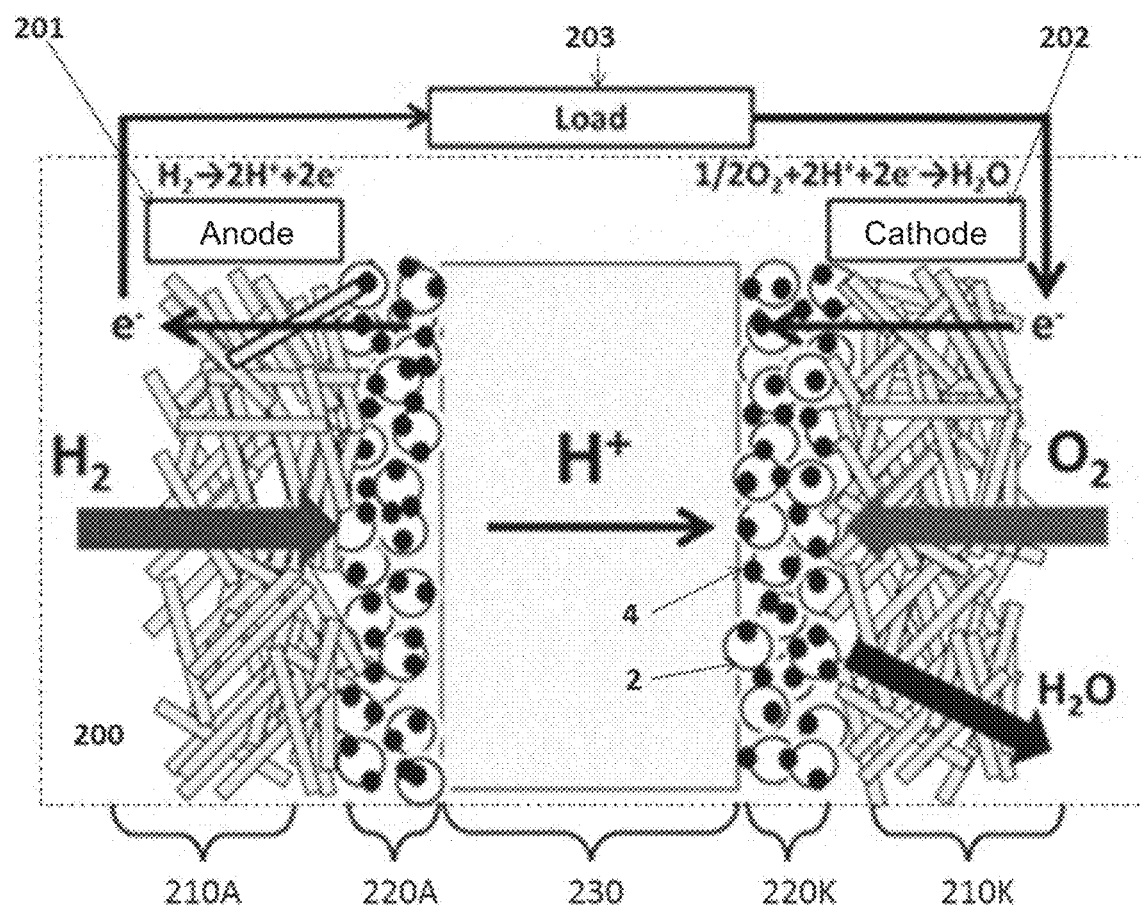
FIG. 7 is a schematic diagram of a fuel cell.

FIG. 7 shows a schematic diagram of a fuel cell. In FIG. 7, a fuel cell 200 is configured such that a catalyst layer 220A and a gas diffusion layer 210A on a side of an anode 201 and a catalyst layer 220K and a gas diffusion layer 210K on a side of a cathode 202 face each other, respectively, interposing an electrolyte membrane 230 therebetween. The anode-side gas diffusion layer 210A, the anode-side catalyst layer 220A, the electrolyte membrane 230, the cathode-side catalyst layer 220K, and the cathode-side gas diffusion layer 210K are arranged in this order. By connecting a load 203 between the anode 201 and the cathode 202 of the fuel cell 200, electric power is output to the load 203.

The cathode-side catalyst layer 220K preferably contains the supported metal catalyst 1. When the cathode reaction occurs at a deep position of the pores 5, water generated by the reaction is not properly discharged, and the activity of the active metal particles 4 is lowered. Since, in the supported metal catalyst 1 of the present invention, the number fraction of the active metal particles 4 supported in the surface layer region of the conductive particles 2 is high, the above problem is alleviated when the cathode-side catalyst layer 220K contains the supported metal catalyst 1.

EXAMPLES

1. Manufacture of Support

The support is manufactured by the method described below.

1-1. Manufacture Example 1 (micelle template, no stirring, interconnected structure)

In Manufacture Example 1, a support that was a powder of carbon particles was manufactured using micelle as a template.

<Cohesion Step>

First, a mixed solution was prepared by mixing phenol: 0.6057 g as the carbon source, formaldehyde solution: 2.1 mL, and 0.1 M NaOH: 15.1613 g.

Next, the mixed solution was stirred at 345 rpm for 0.5 h in a 70° C. bath.

Next, after Pluronic F-127 (manufactured by BASF, non-ionic surfactant, triblock copolymer composed of a hydrophobic block sandwiched between a pair of hydrophilic blocks, hereinafter referred to as "F-127"): 0.96 g as the template molecule and ultrapure water: 15.0033 g were added, the mixed solution was stirred at 345 rpm for 2 h in a 65° C. bath.

Next, after ultrapure water: 50 g was added, the mixed solution was stirred in a 65° C. bath at 345 rpm for 16 to 18 h and then was allowed to stand still at 25° C., and supernatant liquid: 17.7 mL was taken out.

In the reaction described above, the carbon source spheres 7 in which micelle composed of F-127 was coated with resol were generated. Then, self-organization of the carbon source spheres 7 took place and the carbon source cohered bodies 8 were generated.

<Bonding Step>

The dispersion liquid obtained by mixing the supernatant liquid: 17.7 mL and ultrapure water: 56 g was allowed to stand still in an autoclave at 130° C. for 24 h without stirring, so that the carbon source spheres 7 were bonded to each other to form the carbon source bonded bodies.

Next, the carbon source bonded bodies were taken out by filtration and washed with water and then dried by vacuum heating at 50° C.

<Carbonizing Step>

Next, ethanol: 50 g was added to 0.05 g of the carbon source bonded bodies after drying by vacuum heating, and the carbon source bonded bodies were re-dispersed to obtain ethanol sol.

Next, the ethanol sol was dropped onto a glass plate heated by a hot plate and dried by heating.

Next, the carbon source bonded bodes after drying by heating were carbonized by heating in nitrogen at 800° C. for 3 h to obtain a powder of carbon particles.

An electron microscope image shown in FIG. 8 was taken for the obtained powder using a scanning transmission electron microscope (STEM, manufactured by Hitachi High-Technologies Corporation, HD-2700) with an aberration correction lens. As is clear from the electron microscope image, it was found that the carbon particles had continuous thick and thin portions arranged alternately and were interconnected structures in which an average of more than 5 primary particles were interconnected. In the interconnected structures, the average connection number of primary particles was 10 or more, and the average series connection number was 4.3.

The maximum diameter of the thick portion was taken as the primary particle diameter and was measured at 100 or more points, and the average value calculated was 55.7±5.4 nm. Further, the minimum diameter of the thin portion was taken as the diameter of the connected portion of the primary particles and was measured at 100 or more points, and the average value calculated was 37.7±5.4 nm.

Next, the electron microscope image was observed at a magnification of 500,000 to 1,000,000, and the pore size was measured. At that time, the brightness and contrast of the electron microscope image were adjusted, so that the boundary between the outer surface of the primary particles of the carbon particles and the pores opening on the outer surface became clear. Using a particle diameter measurement software (manufactured by NIRECO Corporation, LUZEX AP), the equivalent circle diameter of each pore was measured for 100 or more pores, and the average entrance pore diameter and its standard deviation obtained were 5.2±0.5 nm. The value after ± indicates the standard deviation.

In this regard, pores in the following three cases were not counted. (1) Since the primary particles of the carbon particles are spherical or spindle-shaped, the size of the pores located near a side surface cannot be accurately measured by electron microscope observation. (2) Even after adjusting the brightness and contrast of the electron microscope image, the boundary line between the outer surface of the carbon particles and the pores may not be sufficiently clear depending on the shape of a sample and observation conditions. (3) If the sample is not within the exact focus range, the pore size cannot be accurately obtained.

Next, the circle center coordinates of the pores approximated by a circle were recorded when obtaining the equivalent circle diameter of the pores. The interpore distance was obtained at 100 or more points from the distance between circle center points of the adjacent pores, and the average interpore distance and its standard deviation calculated were 12.6±1.4 nm.

1-2. Manufacture Example 2 (micelle template, stirred at 15 rpm, interconnected structure)

A support that was a powder of carbon particles was manufactured by the same method as in Manufacture Example 1, except that the bonding step was performed while the dispersion liquid was stirred at 15 rpm (equivalent to Reynolds number of 450).

Figure 9:
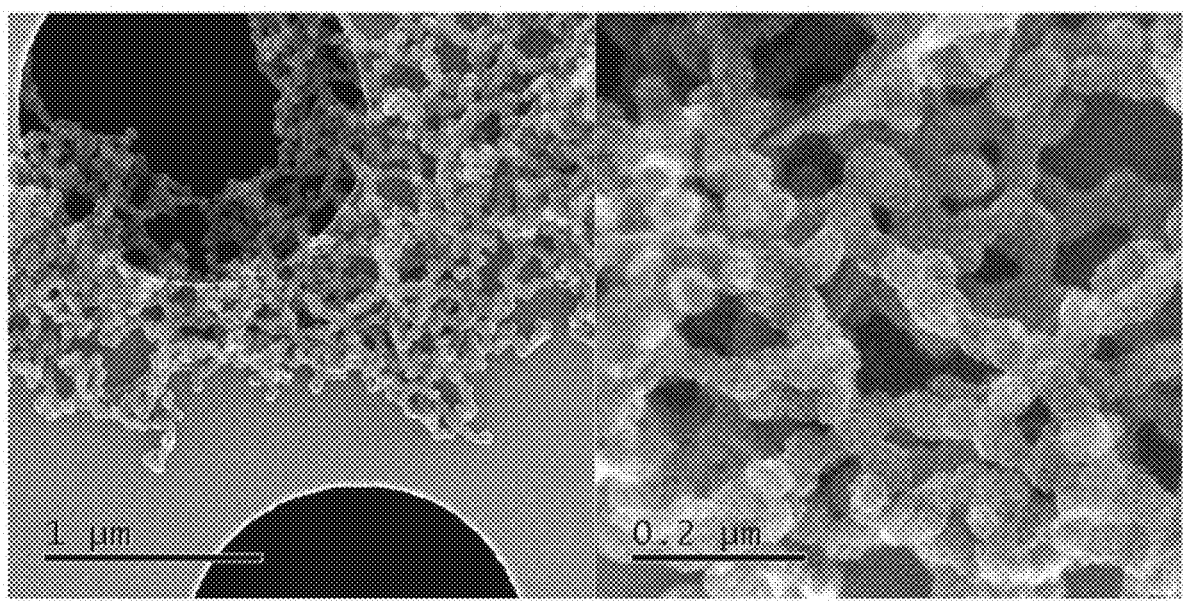
FIG. 9 is an electron microscope image of carbon particles of Manufacture Example 2.

An electron microscope image shown in FIG. 9 was taken for the obtained powder of carbon particles in the same manner as Manufacture Example 1. As is clear from the electron microscope image, it was found that the carbon particles had continuous thick and thin portions arranged alternately and were interconnected structures in which an average of more than 5 primary particles were connected.

1-3. Manufacture Example 3 (micelle template, diluted to ½ concentration, interconnected structure)

A support that was a powder of carbon particles was manufactured by the same method as in Manufacture Example 1, except that the dispersion liquid was obtained by mixing the supernatant liquid: 17.7 mL and ultrapure water: 112 g in the bonding step.

Figure 10:
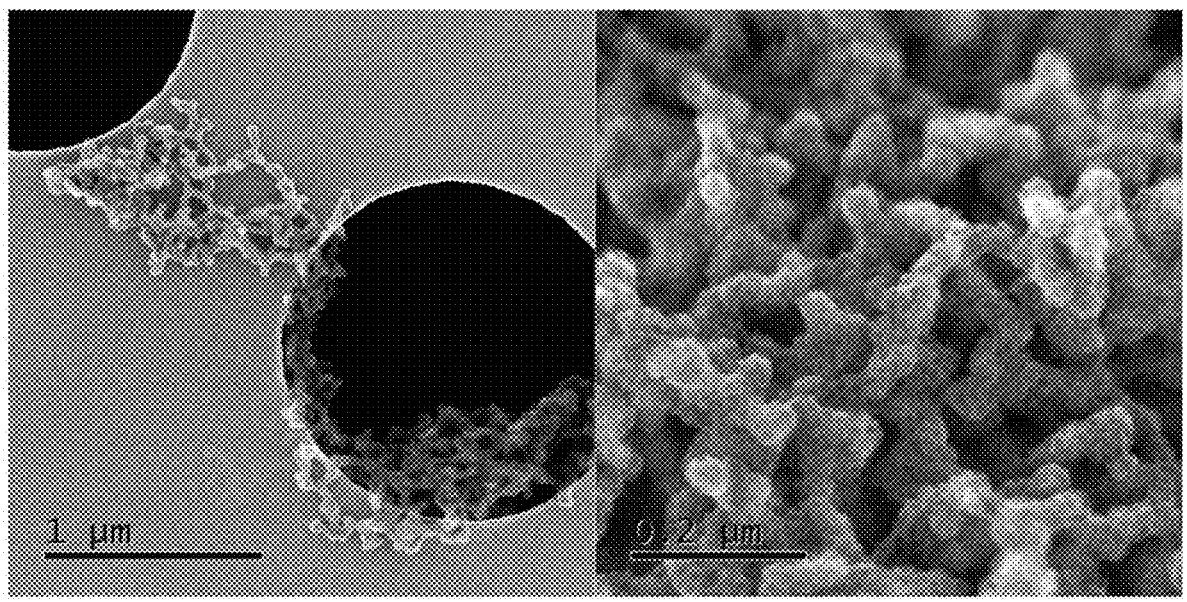
FIG. 10 is an electron microscope image of carbon particles of Manufacture Example 3.

An electron microscope image shown in FIG. 10 was taken for the obtained powder of carbon particles in the same manner as Manufacture Example 1. As is clear from the electron microscope image, it was found that the carbon particles had continuous thick and thin portions arranged alternately and were interconnected structures in which an average of more than 5 primary particles were connected to each other.

1-4. Manufacture Example 4 (micelle template, stirred at 50 rpm, single particle)

A support that was a powder of carbon particles was manufactured by the same method as in Manufacture Example 1, except that the bonding step was performed while stirring the dispersion liquid at 50 rpm (equivalent to Reynolds number of 1490).

Figure 11:
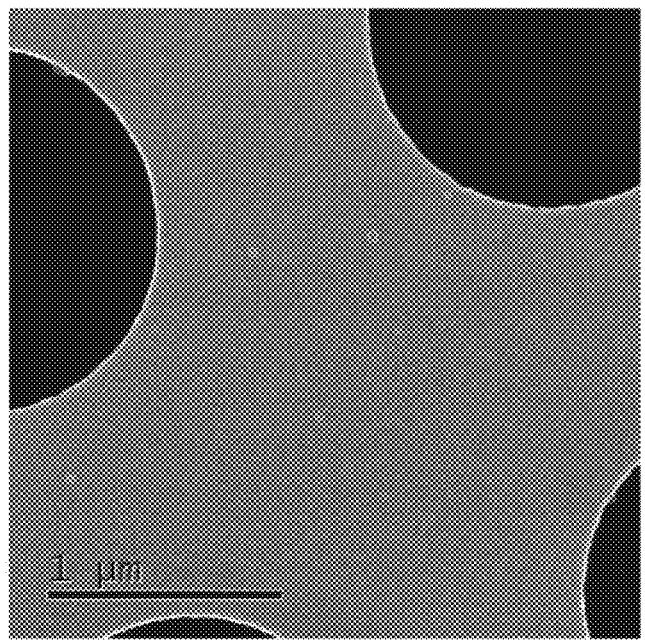
FIG. 11 is an electron microscope image of carbon particles of Manufacture Example 4.

An electron microscope image shown in FIG. 11 was taken for the obtained powder of carbon particles in the same manner as Manufacture Example 1. As is clear from the electron microscope image, it was found that the carbon particles were single particles.

1-5. Manufacture Example 5 (micelle template, stirred at 340 rpm, single particle)

A support that was a powder of carbon particles was manufactured by the same method as in Manufacture Example 1, except that the bonding step was performed while stirring the dispersion liquid at 340 rpm (equivalent to Reynolds number of 10190).

Figure 12:
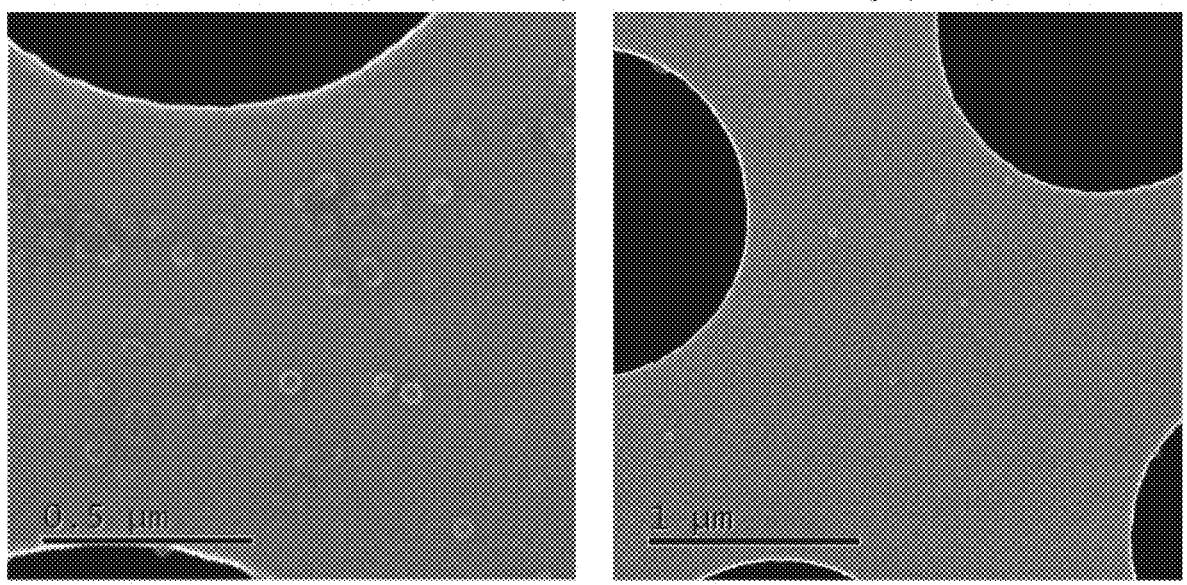
FIG. 12 is an electron microscope image of carbon particles of Manufacture Example 5.

An electron microscope image shown in FIG. 12 was taken for the obtained powder of carbon particles in the same manner as Manufacture Example 1. As is clear from the electron microscope image, it was found that the carbon particles were single particles.

1-6. Manufacture Example 6 (micelle template, coarse particle)

<Resol Precursor Gel Formation Step>

First, the mixed solution was prepared by mixing ethanol: 69.11 g, ultrapure water: 4.48 mL, and F-127: 3.62 g.

Next, the mixed solution was stirred at room temperature for 0.5 h.

Next, after resorcinol: 11.01 g as the carbon source was added, the mixed solution was stirred at room temperature for 0.5 h.

Next, after 37% formalin: 7.3048 g was added, the mixed solution was stirred at room temperature for 0.5 h.

Next, after 5 mol/dm$^3$ hydrochloric acid: 1.182 g was added, the mixed solution was stirred at 30° C. and 300 rpm for 72 h.

Next, after settling, 16.0226 g of the lower layer of two separated phases was taken out.

<Resol Precursor Gel Polymerization Step>

Next, the lower layer taken out was allowed to stand still at 90° C. for 24 h.

<Carbonizing Step>

Next, the carbonization was performed by heating in nitrogen at 800° C. for 3 h to obtain a powder of carbon particles.

Figure 13:
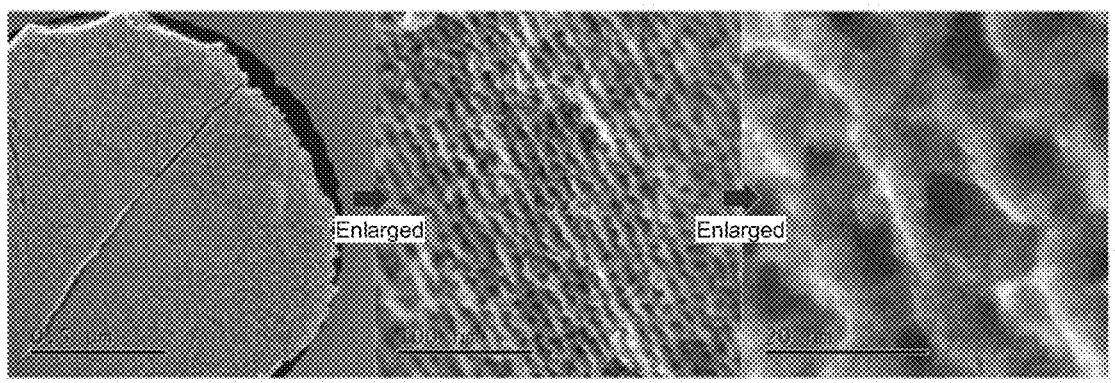
FIG. 13 is an electron microscope image of carbon particles of Manufacture Example 6.

An electron microscope image shown in FIG. 13 was taken for the obtained powder of carbon particles in the same manner as Manufacture Example 1. As is clear from the electron microscope image, the carbon particles were coarse particles.

The average entrance pore diameter, its standard deviation, the average interpore distance, and its standard deviation obtained by the same method as in Manufacturing Example 1 were 4.6±1.1 nm and 10.4±1.1 nm, respectively.

1-7. Manufacture Example 7 (mesoporous silica template)

In Manufacture Example 7, using mesoporous silica as the template, a support that was a powder of carbon particles was manufactured.

<Template Preparation Step>

First, a mixed solution was prepared by mixing ultrapure water: 787.88 mL and 28% ammonia water: 13.32 g.

Next, the mixed solution was stirred at room temperature for 0.5 h.

Next, after ethanol: 696 g and CTAB (cetyltrimethylammonium bromide): 8.5434 g as the template molecule, and ultrapure water: 70.42 g were added, the mixed solution was stirred at room temperature for 2 h.

Next, after TEOS: 17.3 g, acetylacetone: 3.67 g, and titanium isopropoxide: 0.50 g were added, the mixed solution was stirred at room temperature for 16 h. Consequently, nanoparticles of mesoporous silica were obtained.

<Carbon Source Impregnation Transfer Step>

The nanoparticles of mesoporous silica: 1 g, sucrose: 1.25 g as the carbon source, ultrapure water: 1.25 g, and concentrated sulfuric acid: 0.14 g were mixed and stirred at room temperature, and all the liquid was absorbed by the nanoparticles.

<Carbonizing Step>

Next, the carbon source in the nanoparticles was carbonized by heating in nitrogen at 900° C. for 6 h.

<Template Removal Step>

Next, the template of the nanoparticles was removed by adding 2.5 wt % NaOH aqueous solution: 50 mL and stirring it at 100° C. for 1 h, and a powder of carbon particles was obtained.

Figure 14:
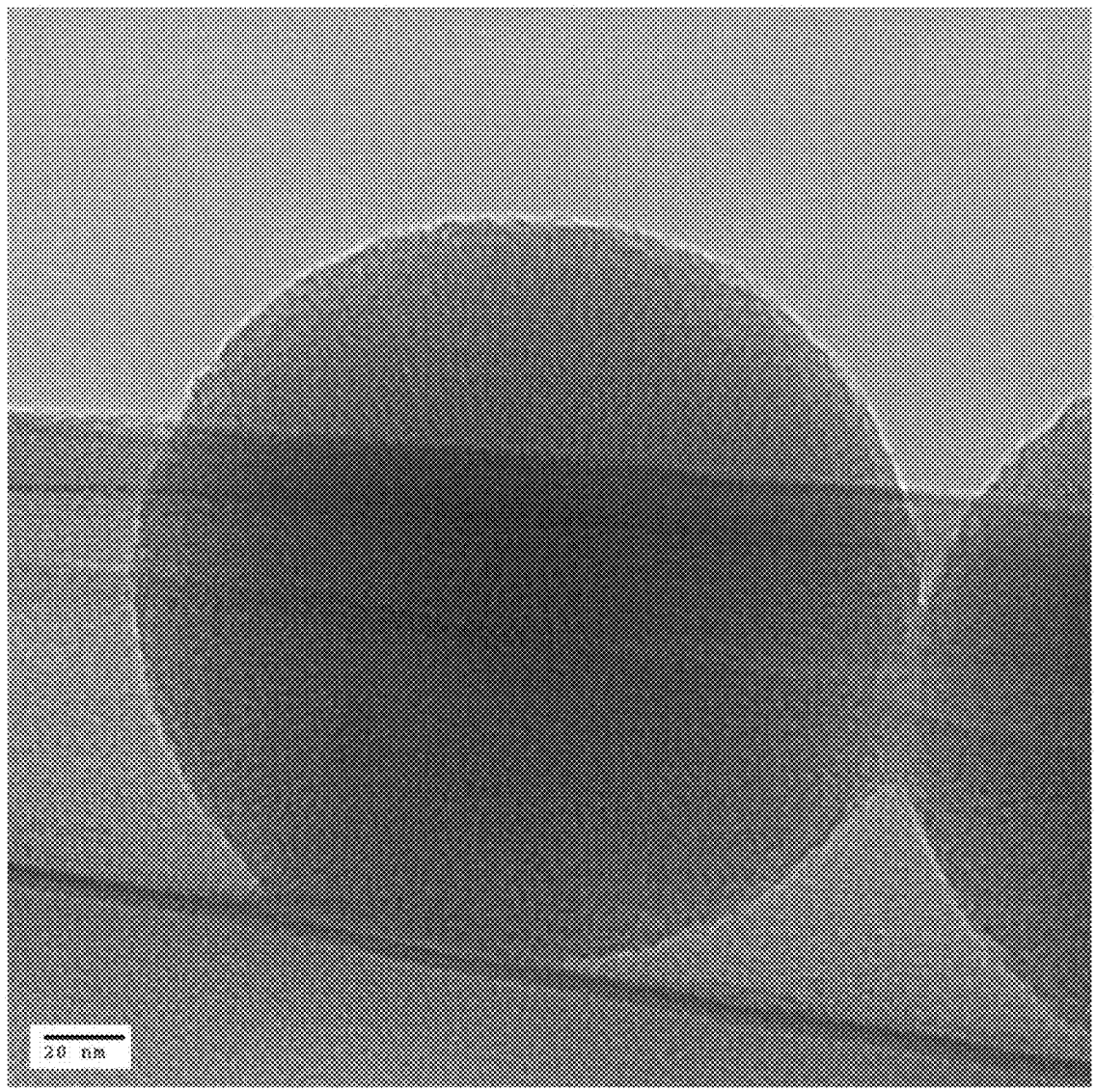
FIG. 14 is an electron microscope image of carbon particles of Manufacture Example 7.

An electron microscope image shown in FIG. 14 was taken for the obtained powder of carbon particles in the same manner as Manufacture Example 1. As is clear from the electron microscope image, the carbon particles were dispersed spherical particles.

The average entrance pore diameter, its standard deviation, the average interpore distance, and its standard deviation obtained by the same method as in Manufacturing Example 1 were 2.5±0.4 nm, 2.4±0.5 nm, respectively.

1-8. Manufacture Example 8 (concentration dependence of carbon source sphere in the bonding step)

Figure 15:
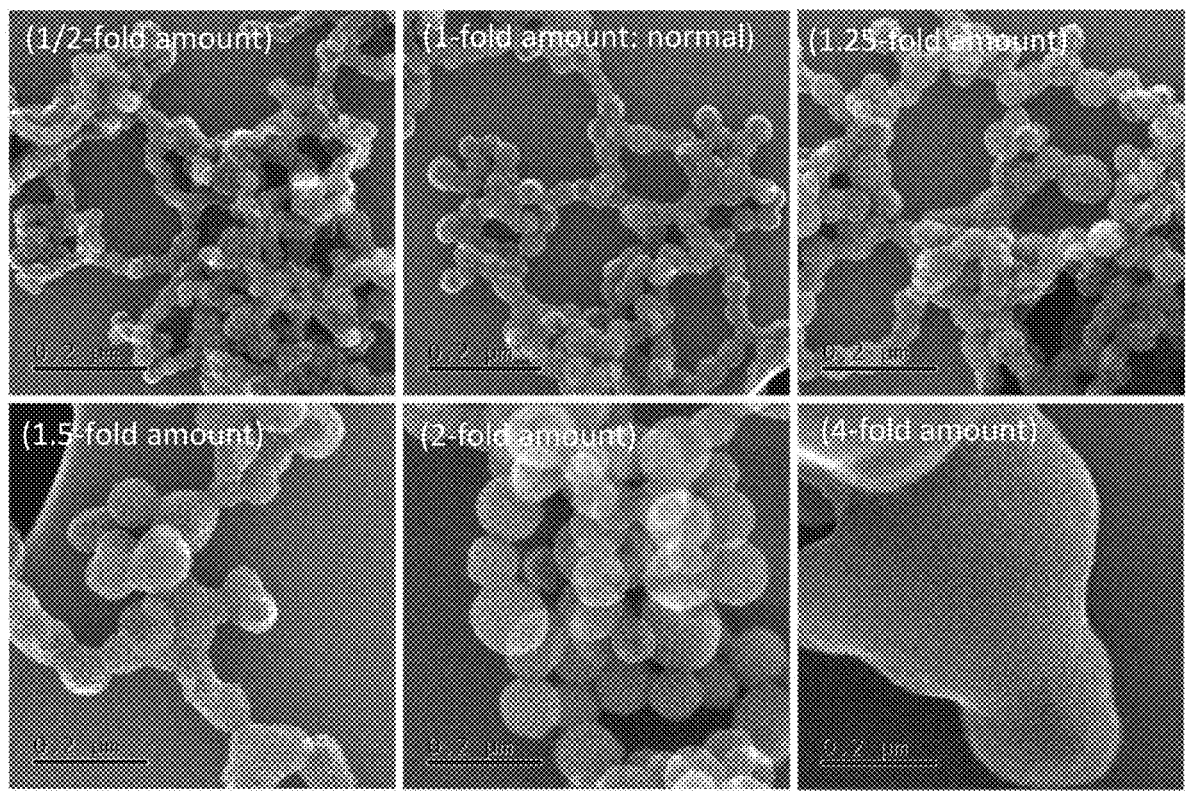
FIG. 15 is an electron microscope image of various carbon source bonded bodies obtained by changing the concentration of carbon source spheres in a bonding step in Manufacture Example 8.

FIG. 15 shows an electron microscope image of the carbon source bonded bodies obtained when the amount of supernatant liquid was changed (that is, when the concentration of the carbon source spheres 7 in the dispersion liquid was changed) in the bonding step of Manufacture Example 1. The amount of supernatant liquid used herein was 17.7 mL in the case of 1-fold amount and was 8.9 mL, 22.1 mL, 26.6 mL, 35.4 mL, 70.8 mL in the case of ½-fold amount, 1.25-fold amount, 1.5-fold amount, 2-fold amount, 4-fold amount, respectively. By increasing the amount of supernatant liquid, the primary particle diameter of the carbon source bonded bodies and the diameter of the connected portions are increased, and thus the structure can be controlled.

1-9. Manufacture Example 9 (heating temperature dependence in the bonding step)

Figure 16:
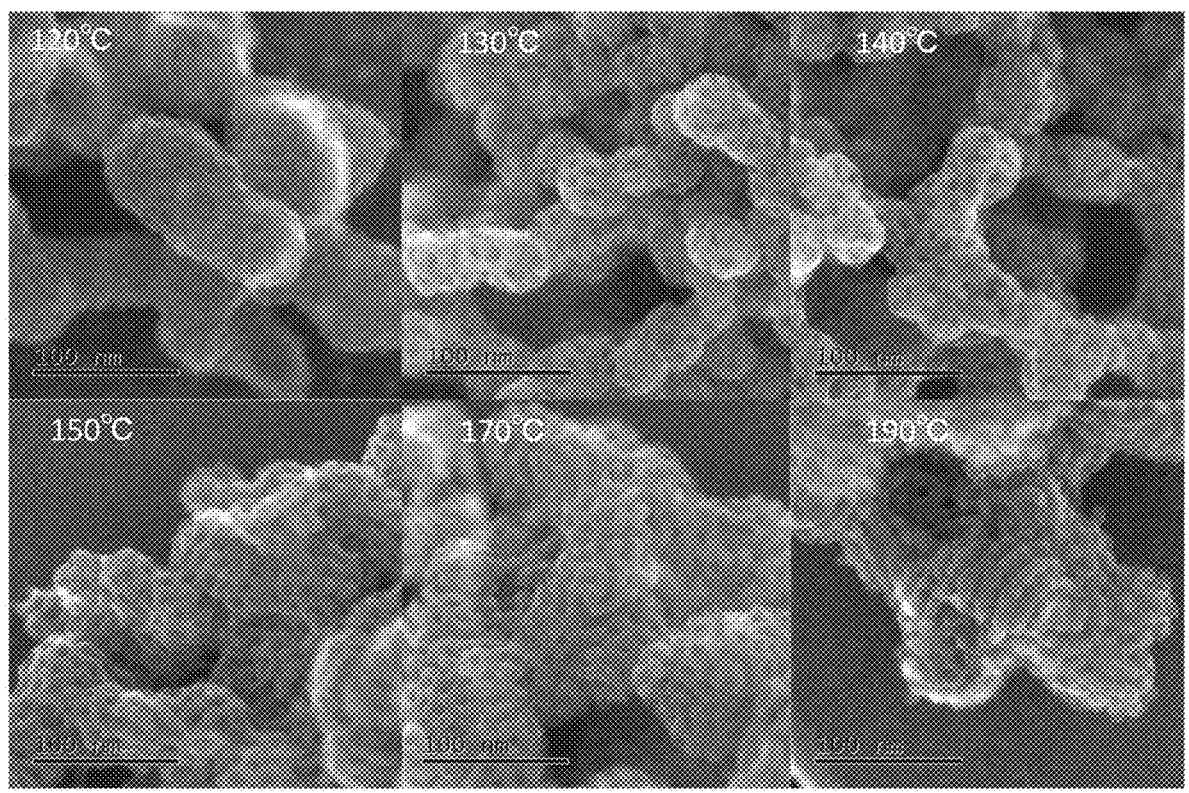
FIG. 16 is an electron microscope image of various carbon source bonded bodies obtained by changing heating temperature in the bonding step in Manufacture Example 9.

FIG. 16 shows an electron microscope image of the carbon source bonded bodies obtained when the heating temperature during the autoclave treatment in the bonding step of Manufacture Example 1 was changed. By changing the heating temperature, the primary particle diameter, the diameter of the connected portions, and the shape of the nanopores are changed, and thus the structure can be controlled.

1-10. Manufacture Example 10 (effect of annealing temperature)

Figure 17:
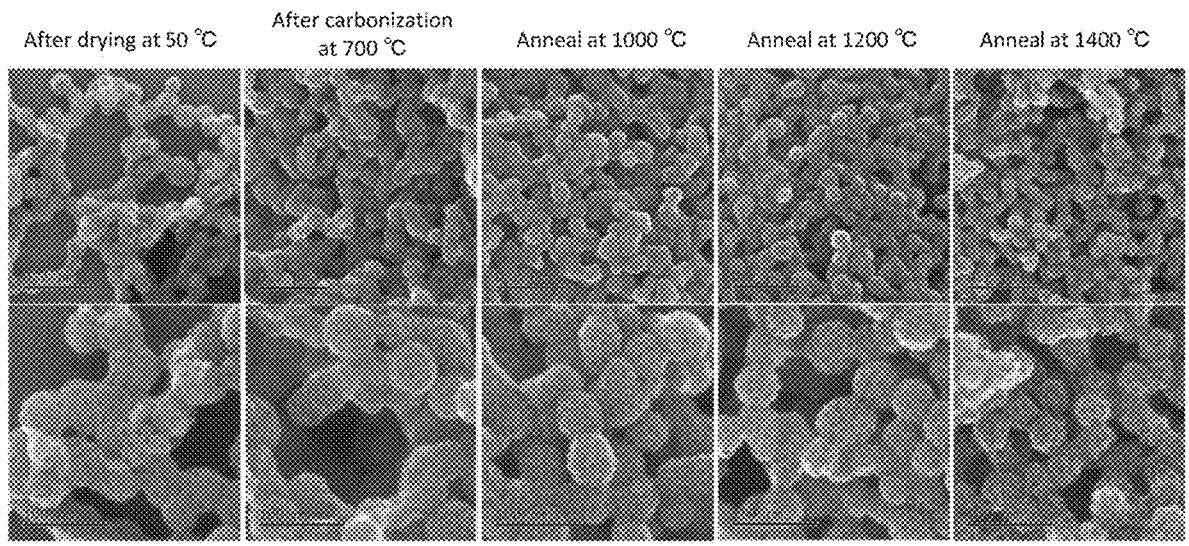
FIG. 17 is an electron microscope image of various carbon particles obtained by changing annealing temperature after a carbonizing step in Manufacture Example 10.

FIG. 17 shows an electron microscope image of the powder of the carbon particles obtained when the amount of supernatant liquid in the bonding step of Manufacture Example 1 was set to 1.25-fold amount, the heating temperature in nitrogen in the carbonizing step was set to 700° C., and then vacuum annealing treatment was performed at 1000° C., 1200° C., or 1400° C. It was found that the primary particle diameter, the diameter of connected portions, and the nanopore structure of the carbon particles change depending on the annealing temperature, and thus the structure can be controlled.

1-10. Manufacture Example 10 (spray freeze drying)

In Manufacture Example 10, a support was manufactured by the same method as in Manufacture Example 1, except that the carbonizing step was performed as follows.

<Carbonizing Step>

First, 0.3 g of the powder of the carbon source bonded bodies after drying by vacuum heating obtained in the bonding step of Manufacture Example 1 was treated in 40 mL of ultrapure water for 5 min using an ultrasonic homogenizer to prepare dispersion liquid. Next, this dispersion liquid was sprayed into 750 mL of liquid nitrogen. The obtained frozen fine powder was subjected to a freeze-drying step for 16 h in a freeze-drying apparatus to obtain a dry powder of the carbon source bonded bodies.

Next, the dry powder obtained in the above-described step was carbonized by heating in nitrogen at 700° C. for 2 h to obtain a powder of carbon particles. The obtained powder of carbon particles had a very low degree of cohesion between the particles.

2. Supporting Active Metal Particle

The active metal particles were supported on the support by the method described below.

2-1. Example 1 (reverse micelle method, Rw=3, coarse particle)

<Mixing Step>

A 60 mmol/L of surfactant (NP-5, polyoxyethylene nonylphenyl ether with an average of 5 oxyethylene groups)/cyclohexane solution was prepared in a volumetric flask.

After allowing the prepared solution to stand still for one day, the addition amount of 40 mmol/L (Pt: 7684 ppm) of $H_2PtCl_6$ aqueous solution was adjusted so that Rw was equal to 3 (mol/mol) to prepare the active metal precursor mixed solution. Here, Rw is a molar ratio between water and the surfactant (water/surfactant).

<Reduction Step>

While the obtained active metal precursor mixed solution was stirred at room temperature for 5 h, 20 equivalents of $NaBH_4$ with respect to Pt was added. At this time, $H_2PtCl_6$ was reduced by $NaBH_4$, causing a change in the color tone of the solution, and the platinum particles were encapsulated in the reverse micelles. The count median diameter of the reverse micelles measured by the dynamic scattering method was 5.9 nm. This was 1.28 times as large as the average entrance pore diameter (=4.6 nm) of the carbon particles obtained in Manufacture Example 6.

<Supporting Step>

The carbon particles obtained in Manufacture Example 6 were put into the solution after the reduction step so that the amount of Pt supported was 20 wt %, and the solution was stirred overnight at room temperature.

Next, the obtained product was filtered through a membrane filter, washed with methanol (100 mL) on the membrane filter, and subjected to drying under reduced pressure to remove the surfactant. Through the above steps, the supported metal catalyst in which the platinum particles were supported on the carbon particles was obtained.

The average particle diameter of the platinum particles supported on the carbon particles was calculated by the method described below. First, the Pt-supported catalyst was placed on a grid with a carbon supporting film for an electron microscope, and from the image obtained by observing it with an electron microscope, the average particle diameter of the platinum particles was calculated by the elliptical approximation. As a result, the average particle diameter of the platinum particles was 2.9 nm.

The number fraction of the platinum particles supported in the surface layer region (hereinafter, referred to as "particles supported on the surface layer") was calculated by the method described below. First, the powder of the carbon particles supporting the platinum particles was placed on a silicon wafer substrate, and the protective layer was formed on the outer surface of the sample particles by gold vapor deposition. Then, the focused ion beam (FIB) device (FB2200, manufactured by Hitachi High-Technologies Corporation) was used to cut the sample particles with the gallium ion beam, and a sample section for electron microscope observation was prepared. Then, when observing the cut surface with an electron microscope, metal particles (Au particles and Pt particles) present on the sample were observed from a Z-contrast image (atomic number contrast image) shown on the right side of FIG. 18, and at the same time, the composition of each of the metal particles was analyzed using an energy-dispersive X-ray spectrometer to distinguish between Pt particles and Au particles. The point of change (boundary line) from a portion where both Au and Pt particles existed to a portion where only Pt particles existed without the Au particles was defined as the boundary line between the outer surface and the cross section of the carbon particle. On the electron microscope image, a line segment B2 parallel to the outer surface boundary line was drawn at a position 15 nm from the above-described sample outer surface boundary line B1 in the direction toward the center of the sample particle, and the number fraction of the particles supported on the surface layer was calculated from the ratio of the number of Pt particles between the outer surface boundary line B1 and the line segment B2 at the 15 nm position and the number of Pt particles deeper beyond the line segment at the 15 nm position in the direction toward the center of the sample particle. As a result, the number fraction of the particles supported on the surface layer was 86%.

Further, the number fraction of the particles supported in the pores (hereinafter, referred to as "particles supported in the surface layer pores") divided by the total number of the particles supported on the surface layer was calculated by the method described below. In the STEM observation of the platinum supported carbon particles, the position of the pore entrance in the plane direction was specified from the secondary electron image, and then the position of all platinum supported on and inside the carbon particles in the observation field was specified in the plane direction from the Z-contrast image. Next, by comparing the obtained position of the pore entrance with the obtained position of platinum, the number fraction of platinum supported in the pores was calculated. At this time, it was determined that the platinum which was observed in the Z-contrast image but was not observed in the secondary electron image was supported inside the pores. The platinum present in the back hemisphere of the carbon particles was excluded with reference to the depth of focus when acquiring the Z-contrast image. As a result, the number fraction of the particles supported in the surface layer pores was 74.4%.

2-2. Reference Example 1 (reverse micelle method, Rw=2 to 6, coarse particle)

Figure 19:
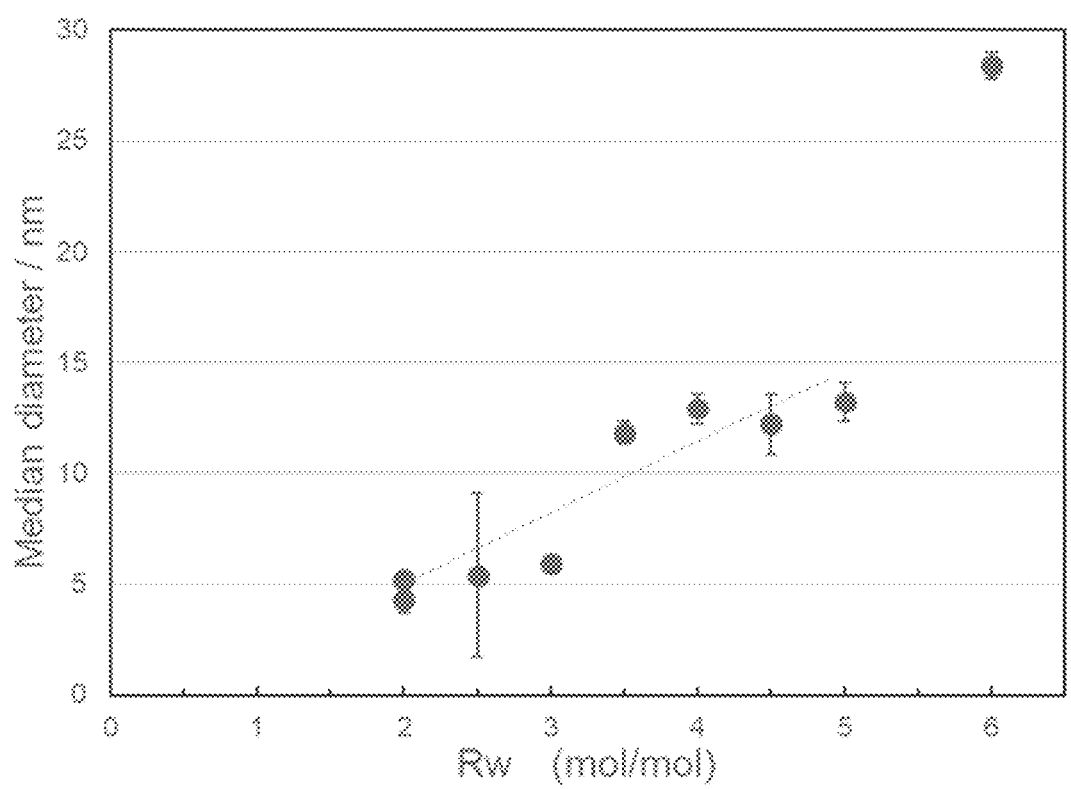
FIG. 19 is a graph showing a relationship between Rw and the count median diameter in the reverse micelle method of Reference Example 1.

The mixing step and the reduction step were performed in the same manner as Example 1, except that Rw was changed within the range between 2 to 6, and the count median diameter measured in the mixed solution after the reduction step by the dynamic light scattering method was measured. The result is shown in FIG. 19. The horizontal axis in FIG. 19 represents Rw, and the vertical axis represents the count median diameter.

The measurement conditions of the count median diameter were as follows.

Measurement device: manufactured by HORIBA, Ltd., model: SZ-100V2 The measurement was performed in the nanoanalysis mode with a gate time of 640 ns. The measurement was performed three times or more, and the average value was taken as the count median diameter.

As shown in FIG. 19, the value of the count median diameter depends on the value of Rw and was about 6 nm when Rw=3.

2-3. Example 2 (reverse micelle method, Rw=3, interconnected structure)

The supported metal catalyst in which the platinum particles were supported on the carbon particles was obtained by the same method as Example 1, except that the carbon particles obtained in Manufacture Example 1 were used in the supporting step. When various measurements were performed in the same manner as Example 1, the average particle diameter of the platinum particles was 2.9 nm, and the number fraction of the particles supported on the surface layer was 98%. Further, the number fraction of the particles supported in the surface layer pores was 56%.

2-4. Example 3 (protective colloid method, coarse particle)

<Mixing Step>

The mixed solution was prepared by mixing 0.66 mmol/L $H_2PtCl_6$ aqueous solution: 713 mL, deionized water: 28 mg, ethylene glycol: 98 mg, and polyvinyl pyrrolidone (PVP): 20 mg.

<Reduction Step>

The obtained mixed solution was refluxed in an oil bath at 120° C. and pulled out of the oil bath when the color tone of the solution changed. At this time, $H_2PtCl_6$ was reduced by ethylene glycol, causing the change in the color tone, and the platinum particles were coordinated with polyvinyl pyrrolidone, resulting in a state of hydrophilic protective colloid. The count median diameter of the protective colloid measured by the dynamic scattering method was 3.5 nm. This was 0.76 times as large as the average entrance pore diameter (=4.6 nm) of the carbon particles obtained in Manufacture Example 6.

<Supporting Step>

The carbon particles obtained in Manufacture Example 6 were put into the solution after the reduction step and stirred overnight at room temperature.

Figure 20:
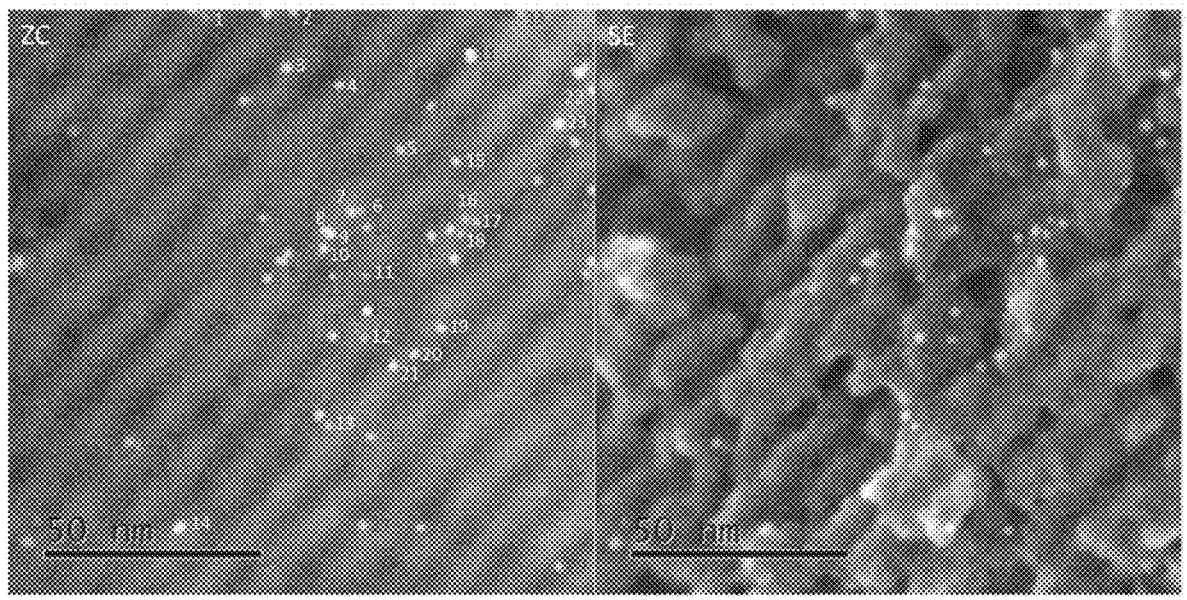
FIG. 20 is a ZC image (Z-contrast image) and an SE image (secondary electron image) of the surface of a supported metal catalyst of Example 3.

Next, the obtained product was filtered through a membrane filter, washed with methanol (100 mL) on the membrane filter and then dried. Through the above steps, the supported metal catalyst in which the platinum particles were supported on the carbon particles was obtained. A ZC image (Z-contrast image) and an SE image (secondary electron image) of the surface of the supported metal catalyst are shown in FIG. 20.

The number fraction of the platinum particles supported on the surface of the carbon particles was calculated by the method described below. First, the number of platinum particles supported in a concave portion and the number of platinum particles supported on a convex portion (the surface of the carbon particles) were counted in the ZC image of FIG. 20. The number fraction was calculated by dividing the number of platinum particles supported on the convex portion by the total number of platinum particles. As a result, the number fraction of platinum particles supported in the pores (concave portion) was 60%.

2-5. Example 4 (protective colloid, interconnected structure)

Figure 21:
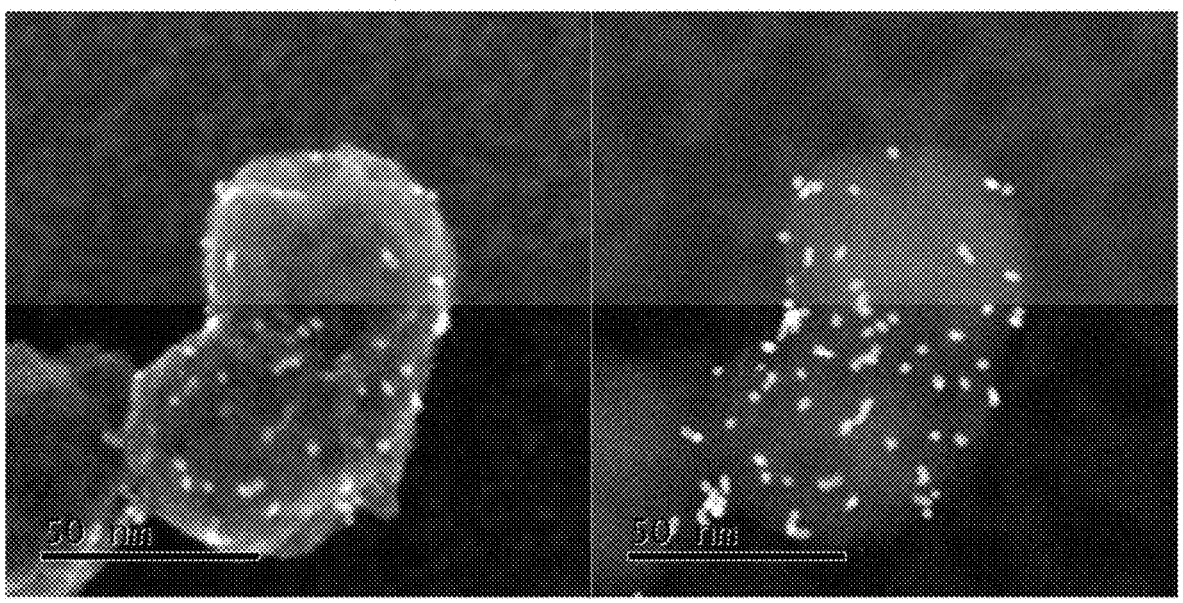
In FIG. 21, the image on the left side is a secondary electron image of a supported metal catalyst of Example 4, and the image on the right side is a Z-contrast image thereof.

The supported metal catalyst in which the platinum particles were supported on the carbon particles was obtained by the same method as Example 3, except that the carbon particles obtained in Manufacture Example 1 was used in the supporting step. The average particle diameter of the platinum particles calculated in the Z-contrast image of FIG. 21 was 2.8 nm. Further, the number fraction of the particles supported on the surface layer was 97%. The number fraction of the particles supported in the surface layer pores was 51%.

2-6. Comparative Example 1 (conventional method, Ketjenblack)

<Supporting Step>

50 mL of ion-exchanged water and $H_2PtCl_6$ aqueous solution (20 g/L in platinum equivalent) were mixed in a flat-bottomed beaker so that Pt weight in the mixture was 150 mg. Next, 150 mg of Ketjenblack (grade: EC300J) as the carbon support was added, and the mixture was stirred. This mixture was heated at 80° C. with stirring on a hot stirrer to evaporate the water content to obtain a powder.

<Reduction Step>

This powder was transferred onto a heat-resistant plate and subjected to reduction treatment under hydrogen stream at 150° C. for 1 h and at 300° C. for 2 h (temperature increase rate at 10° C./min).

The diameter of the platinum particles supported on the carbon particles was calculated by the same method as Example 1. As a result, the average particle diameter of platinum was 4.5 nm. The number fraction of the particles supported on the surface layer calculated by the same method as Example 1 was 31%.

2-7. Comparative Example 2 (conventional method, interconnected structure)

<Supporting Step>

37 mL of ultrapure water, 0.82 g of $H_2PtCl_6$ aqueous solution (20 g/L in platinum equivalent), and 1.96 g of sodium bisulfite were mixed in a flat-bottomed beaker. Next, 150 g of ultrapure water was added, and 5 wt % sodium hydroxide and 30% hydrogen peroxide solution were alternately added to finally adjust the pH to 5.0. The total amount of 30% hydrogen peroxide solution added in this process was 15 mL. Next, 500 mg of the carbon particles obtained in Manufacture Example 1 was added, and the mixture was stirred. This mixture was heated at 90° C. with stirring on a hot stirrer and then cooled, filtered, washed with ultrapure water, and dried to obtain a powder.

<Reduction Step>

This powder was transferred to a quartz U-shaped tube and subjected to a reduction treatment at 300° C. for 2 h (temperature increase rate at 10° C./min) under a hydrogen stream.

Figure 22:
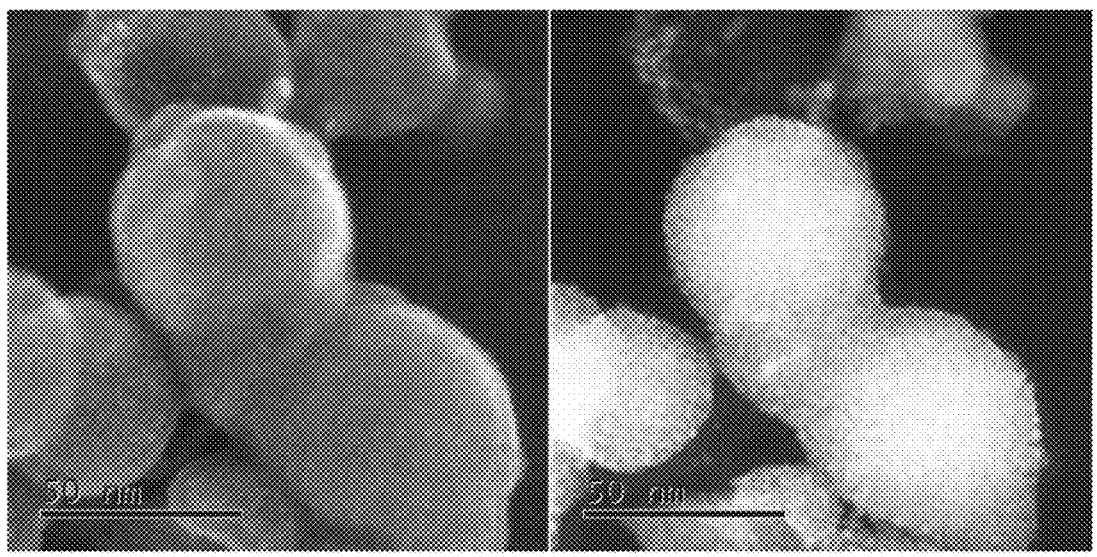
In FIG. 22, the image on the left side is a secondary electron image of a supported metal catalyst of Comparative Example 2, and the image on the right side is a Z-contrast image thereof.

The obtained ZC image (Z-contrast image) and SE image (secondary electron image) of the surface of the supported metal catalyst are shown in FIG. 22. The diameter of the platinum particles supported on the carbon particles was calculated by the same method as Example 1. As a result, the average particle diameter of platinum was 1.1 nm. The comparison of the secondary electron image with the ZC image using STEM showed that the platinum particles were uniformly and non-selectively supported both on the surface layer and inside the support particles.

Figure 18:
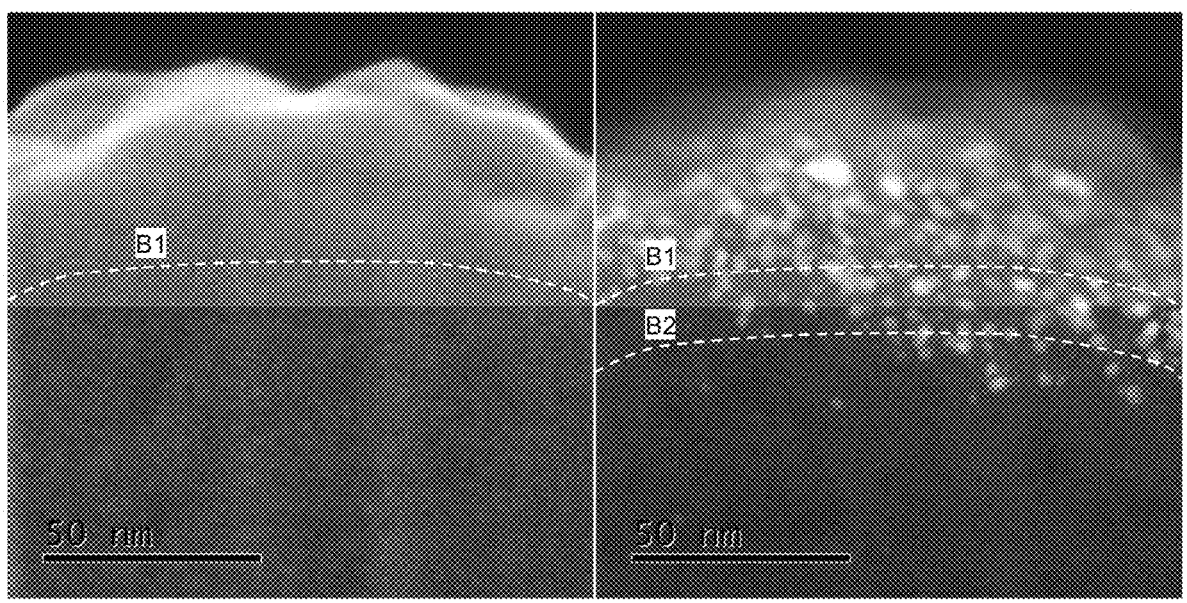
In FIG. 18, the image on the left side is a cross-sectional secondary electron image of a supported metal catalyst of Example 1, and the image on the right side is a Z-contrast image thereof.

Further, in Comparative Example 2, there was no difference in the concentration of the active metal present in the surface layer portion and the central portion, and the active metal was uniformly supported on the entire support. On the other hand, in Example 1 of the present application, there was a difference in the concentration of the active metal present in the surface layer portion and the central portion (surface layer portion>central portion), as shown in FIG. 18.

2-8. Example 5 (reverse micelle method, Rw=3, OMC-NS, two-liquid mixing method)

<Mixing Step>

A 100-mL solution of 60 mmol/L surfactant (NP-5, polyoxyethylene nonylphenyl ether, average addition mole number=5)/cyclohexane was prepared in a volumetric flask.

After allowing the prepared solution to stand still for one day, 40 mmol/L (Pt: 7684 ppm) of $H_2PtCl_6$ aqueous solution was added so that Rw was 3 (mol/mol) to prepare the active metal precursor mixed solution.

<Reduction Step>

Similarly, a solution of 60 mmol/L of surfactant (NP-5, polyoxyethylene nonylphenyl ether, average addition mole number=5)/cyclohexane was prepared in a volumetric flask.

After the prepared solution was allowed to stand still for one day, $NaBH_4$ aqueous solution was added so that Rw became 3 (mol/mol), to prepare the reducing agent mixed solution. Here, $NaBH_4$ was added so that its concentration became 20 equivalent with respect to Pt. Then, the reducing agent mixed solution was added to the active metal precursor mixed solution and mixed with stirring.

At this time, the diameter of the reverse micelle obtained by reducing $H_2PtCl_6$ with $NaBH_4$ was 6.1 nm in the solution. This was 1.3 times as large as the average entrance pore diameter (=4.6 nm) of the carbon particles obtained in Manufacture Example 6.

<Supporting Step>

Figure 23:
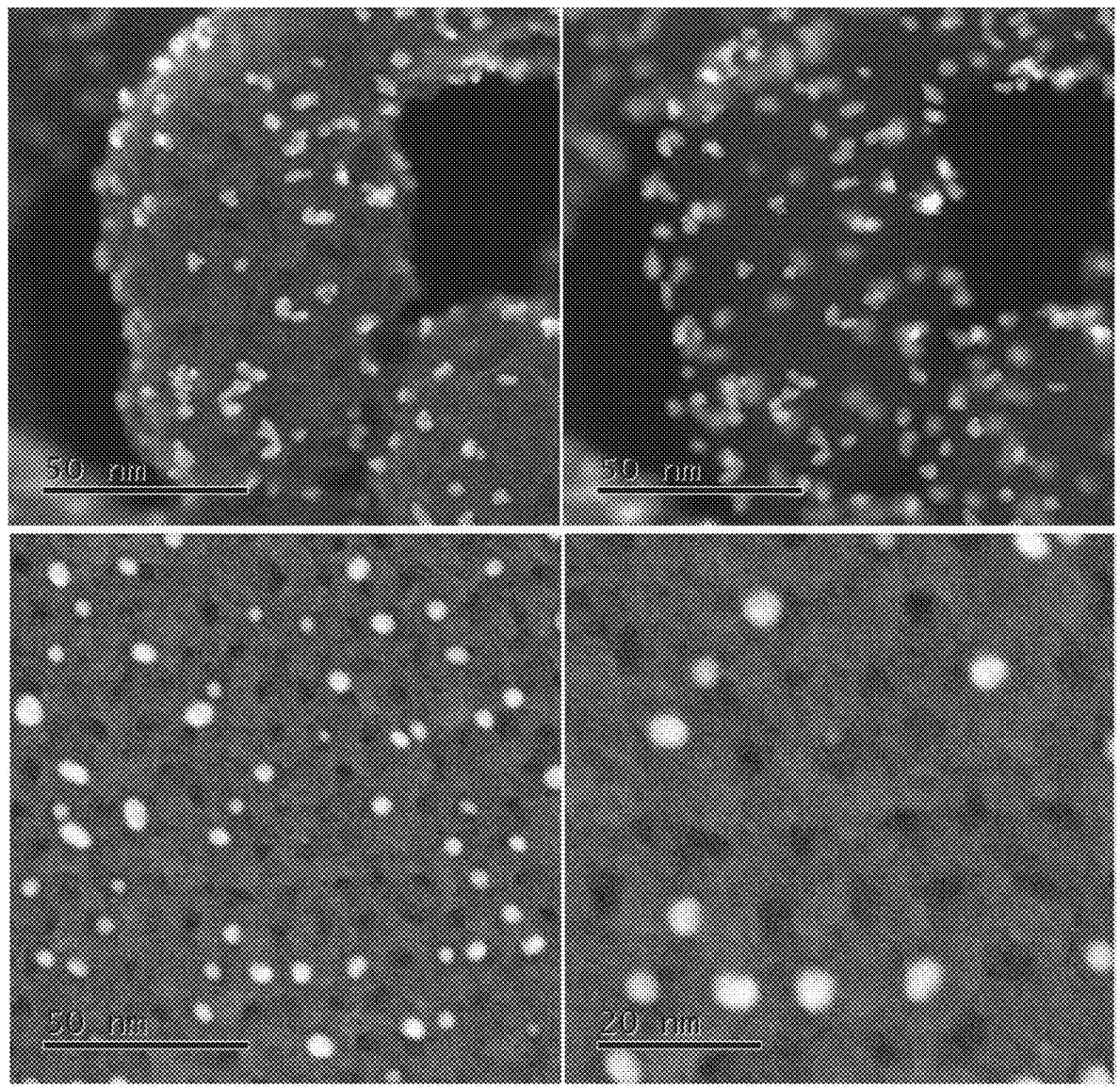
In FIG. 23, the image on the upper left side is a secondary electron image of a supported metal catalyst of Example 5, the image on the upper right side is a Z-contrast image thereof, the images on the lower left and right sides are another secondary electron image of the supported metal catalyst of Example 5.

By performing the supporting step by the same method as in Example 1, the supported metal catalyst in which the platinum particles were supported on the carbon particles was obtained. At this time, the amount of Pt supported was set to 20 wt %. The obtained ZC image (Z-contrast image) and SE image (secondary electron image) of the surface of the supported metal catalyst are shown in FIG. 23.

The average particle diameter of the platinum particles calculated by the same method as Example 1 was 4.8 nm. The number fraction of the particles supported in the surface layer pores calculate by the same method as Example 1 was 60% or more.

<Oxygen Reduction Activity>

The oxygen reduction activity of the prepared catalyst was measured by the rotating disk electrode (RDE) method. The catalyst ink was prepared by ultrasonically dispersing the catalyst powder in an ethanol solution containing a small amount of ultrapure water. The catalyst ink was dropped onto a glassy carbon disk having a diameter of 10 mm and was dried in an ethanol vapor atmosphere. The dropping and drying of the ink were repeated several times so that the amount of Pt supported was 11 μg/cm$^2$ (representative value). Next, 5 wt % Nafion solution was dropped so that the thickness of the Nation film after drying was 0.05 μm, and the sample was dried at room temperature and then placed in an electric furnace maintained at 130° C. for 3 h. The glassy carbon disk coated with the catalyst fixed to a stainless-steel rod was used as a working electrode and attached to a RDE device, and then the working electrode was immersed in a Pyrex three-pole cell filled with 0.1 M perchloric acid electrolyte. After purging the electrolyte with nitrogen for 30 min, the sweep was repeated at a scan rate of 500 mV/s from 0.05 V to 1.0 V until there was no change in the waveform of cyclic voltammogram. Next, the electrochemical surface area (ECA) was obtained from the area of the hydrogen adsorption wave of the cyclic voltammogram obtained at a scan rate of 50 mV/s from 0.05 V to 1.0 V. Next, the electrolyte was purged with oxygen for 30 min, and the linear sweep voltammogram was obtained by sweeping at a scan rate of 5 mV/s from 0.25 V to 1.0 V. The area specific activity and mass activity were calculated from the Koutecky-Levich plot using the current values of the obtained linear sweep voltammogram at 0.70 V, 0.75 V, 0.85

V, 0.90 V. As shown in Table 1, the catalyst of Example 5 (20 wt % Pt/OMC catalyst) prepared by the reverse micelle method exhibited 1.5 to 6.1 times the mass activity of a commercially available catalyst (manufactured by Tanaka Kikinzoku Kogyo, product name: TEC10E50E, 50 wt % Pt/CB catalyst).

TABLE 1

|  | Measured potential | Example 5 | Commercially available catalyst |
|---|---|---|---|
| Mass activity MA (A/g) | 0.70 V | 13505 | 2202 |
|  | 0.75 V | 6461 | 1228 |
|  | 0.80 V | 2246 | 574 |
|  | 0.85 V | 589 | 253 |
|  | 0.90 V | 121 | 83 |

REFERENCE SIGNS LIST

1: supported metal catalyst, 2: conductive particle, 2a: interconnected structure, 2b: primary particle, 2c: connected portion, 2d: surface, 3: support, 4: active metal particle, 5: pore, 7: carbon source sphere, 8: carbon source cohered body, 8a: gap, 200: fuel cell, 201: anode, 202: cathode, 203: load, 210A: anode-side gas diffusion layer, 210K: cathode-side gas diffusion layer, 220A: anode-side catalyst layer, 220K: cathode-side catalyst layer, 230: electrolyte membrane

The invention claimed is:

1. A supported metal catalyst, comprising:
a support that is a collective body of conductive particles; and
dispersed active metal particles supported on the conductive particles,
wherein the conductive particles include a plurality of pores,
an average entrance pore diameter of the pores is 1 to 20 nm,
a standard deviation of the average entrance pore diameter is equal to or less than 50% of the average entrance pore diameter,
a number fraction of the active metal particles supported in a surface layer region of the conductive particles divided by a total number of the active metal particles is equal to or more than 50%,
the surface layer region is a region on a surface of the conductive particles and a region in the pores within a depth of 15 nm from the surface,
an average interpore distance of the pores is 5 to 20 nm, and
a standard deviation of the average interpore distance is equal to or less than 50% of the average interpore distance.

2. The supported metal catalyst of claim 1, wherein the conductive particles are carbon particles.

3. The supported metal catalyst of claim 1, wherein the conductive particles are interconnected structures in which an average of 5 or more primary particles are interconnected.

4. The supported metal catalyst of claim 3, wherein an average series connection number of the interconnected structures is equal to or more than 3.

5. The supported metal catalyst of claim 1, wherein an average primary particle diameter of the conductive particles is 20 to 100 nm.

6. The supported metal catalyst of claim 1, wherein a number fraction of the active metal particles supported in the pores divided by a total number of the active metal particles supported in the surface layer region is equal to or more than 40%.

7. The supported metal catalyst of claim 1, wherein the active metal particles are platinum or platinum alloy particles.

8. The supported metal catalyst of claim 1, an average particle diameter of the active metal particles is 1 to 8 nm.

9. The supported metal catalyst of claim 1, wherein a value of an average particle diameter of the active metal particles divided by the average entrance pore diameter is 0.2 to 0.8.

10. The supported metal catalyst of claim 1, wherein the number fraction of the active metal particles supported in the surface layer region of the conductive particles divided by the total number of the active metal particles is equal to or more than 60%.

11. A fuel cell, comprising: a cathode-side catalyst layer, wherein the cathode-side catalyst layer includes the supported metal catalyst of claim 1.

12. A manufacturing method of a supported metal catalyst, comprising:
a mixing step;
a reduction step; and
a supporting step,
wherein, in the mixing step, an active metal precursor mixed solution is generated by mixing an active metal precursor solution containing an active metal precursor with a surfactant and an organic solvent,
in the reduction step, active metal particles are generated by reducing the active metal precursor in the active metal precursor mixed solution,
in the supporting step, the active metal particles are dispersed and supported on conductive particles by mixing a support and the active metal particles, the support being a collective body of the conductive particles,
the conductive particles include a plurality of pores,
a number fraction of the active metal particles supported in a surface layer region of the conductive particles divided by a total number of the active metal particles is equal to or more than 50%,
an average entrance pore diameter of the pores is 1 to 20 nm,
a standard deviation of the average entrance pore diameter is equal to or less than 50% of the average entrance pore diameter, and
a reverse micelle diameter is 0.5 to 2 times as large as the average entrance pore diameter,
the reverse micelle diameter is a count median diameter measured in the mixed solution by a dynamic light scattering method,
the active metal particles are in a state of being confined in the reverse micelle,
an average interpore distance of the pores is 5 to 20 nm, and
a standard deviation of the average interpore distance is equal to or less than 50% of the average interpore distance.

13. The method of claim 12, wherein the organic solvent is a hydrophobic organic solvent and includes at least one selected from cyclohexane, heptane, and toluene.

14. The method of claim 12,
wherein the surfactant is a nonionic surfactant.

15. The method of claim 12,
wherein, in the reduction step, the active metal precursor is reduced by mixing a solution containing a reducing agent, the organic solvent, water and the surfactant with the active metal precursor mixed solution.

16. A manufacturing method of a supported metal catalyst, comprising:
a mixing step;
a reduction step; and
a supporting step,
wherein, in the mixing step, a mixed solution is generated by mixing an active metal precursor solution containing an active metal precursor with a protecting polymer agent and a reducing agent,
in the reduction step, active metal particles are generated by reducing the active metal precursor in the mixed solution,
in the supporting step, the active metal particles are dispersed and supported on conductive particles by mixing a support and the active metal particles, the support being a collective body of the conductive particles,
the conductive particles include a plurality of pores,
a number fraction of the active metal particles supported in a surface layer region of the conductive particles divided by a total number of the active metal particles is equal to or more than 50%,
an average entrance pore diameter of the pores is 1 to 20 nm,
a standard deviation of the average entrance pore diameter is equal to or less than 50% of the average entrance pore diameter,
a diameter of entire hydrophilic protective colloid is 0.5 to 2 times as large as the average entrance pore diameter,
the diameter of entire hydrophilic protective colloid is a count median diameter measured in the mixed solution by a dynamic light scattering method,
the active metal particles are in a state of the hydrophilic protective colloid,
an average interpore distance of the pores is 5 to 20 nm, and
a standard deviation of the average interpore distance is equal to or less than 50% of the average interpore distance.

17. The method of claim 16,
wherein the protecting polymer agent includes at least one selected from polyvinyl pyrrolidone, polyacrylic acid, and polyvinyl alcohol.

18. The method of claim 12,
wherein the active metal precursor includes a platinum precursor compound.

* * * * *